United States Patent [19]
Abitbol et al.

[11] Patent Number: 5,855,074
[45] Date of Patent: Jan. 5, 1999

[54] METHODS AND APPARATUS FOR MEASURING AND MAPPING OPTHALMIC ELEMENTS

[75] Inventors: Mordechai Abitbol; Emile Tederry; Eli Meimoun, all of Jerusalem, Israel

[73] Assignee: Visionix Ltd., Jerusalem, Israel

[21] Appl. No.: 18,360

[22] Filed: Feb. 4, 1998

[51] Int. Cl.⁶ ............................................. G01B 11/00
[52] U.S. Cl. ............................................................. 33/507
[58] Field of Search .............................. 351/41, 42, 177; 33/507; 356/127; 451/42, 43

[56] References Cited

U.S. PATENT DOCUMENTS

| | | |
|---|---|---|
| 4,098,002 | 7/1978 | Campbell et al. . |
| 4,115,924 | 9/1978 | Kleinkopf ................................. 33/507 |
| 4,781,452 | 11/1988 | Ace ......................................... 351/177 |
| 5,152,067 | 10/1992 | Kurachi et al. . |
| 5,175,594 | 12/1992 | Campbell . |
| 5,303,022 | 4/1994 | Humphrey et al. . |
| 5,307,141 | 4/1994 | Fujieda . |
| 5,339,151 | 8/1994 | Shinn . |
| 5,469,261 | 11/1995 | Hellmuth et al. . |

FOREIGN PATENT DOCUMENTS

| | | |
|---|---|---|
| 676629 | 11/1995 | European Pat. Off. . |
| WO 95/34800 | 12/1995 | WIPO . |

OTHER PUBLICATIONS

D. and Z. Malacara, "Testing and Centering of Lenses by Means of a Hartmann Test With Four Holes", Published in Optical Engineering, vol. 31, No. 7 Jul. 1992, pp. 1551–1555.

Brochure: Visionix, A Vision of the Future, Visual Contact Lens Mapping, VC–2000.

Brochure: Visionix, A Vision of the Future, Visual Lens Mapping VL–2000.

*Primary Examiner*—George Manuel
*Attorney, Agent, or Firm*—Darby & Darby

[57] ABSTRACT

This invention discloses an apparatus for providing optical information regarding spectacles in which are mounted first and second lenses, the apparatus includes a spectacles mapper operative to compute a map, within a single coordinate system, of at least one optical characteristic over both of the two lenses, and a spectacles analyzer operative to provide an output indication of optical information related to the map.

A method for providing optical information regarding spectacles is also disclosed.

28 Claims, 36 Drawing Sheets

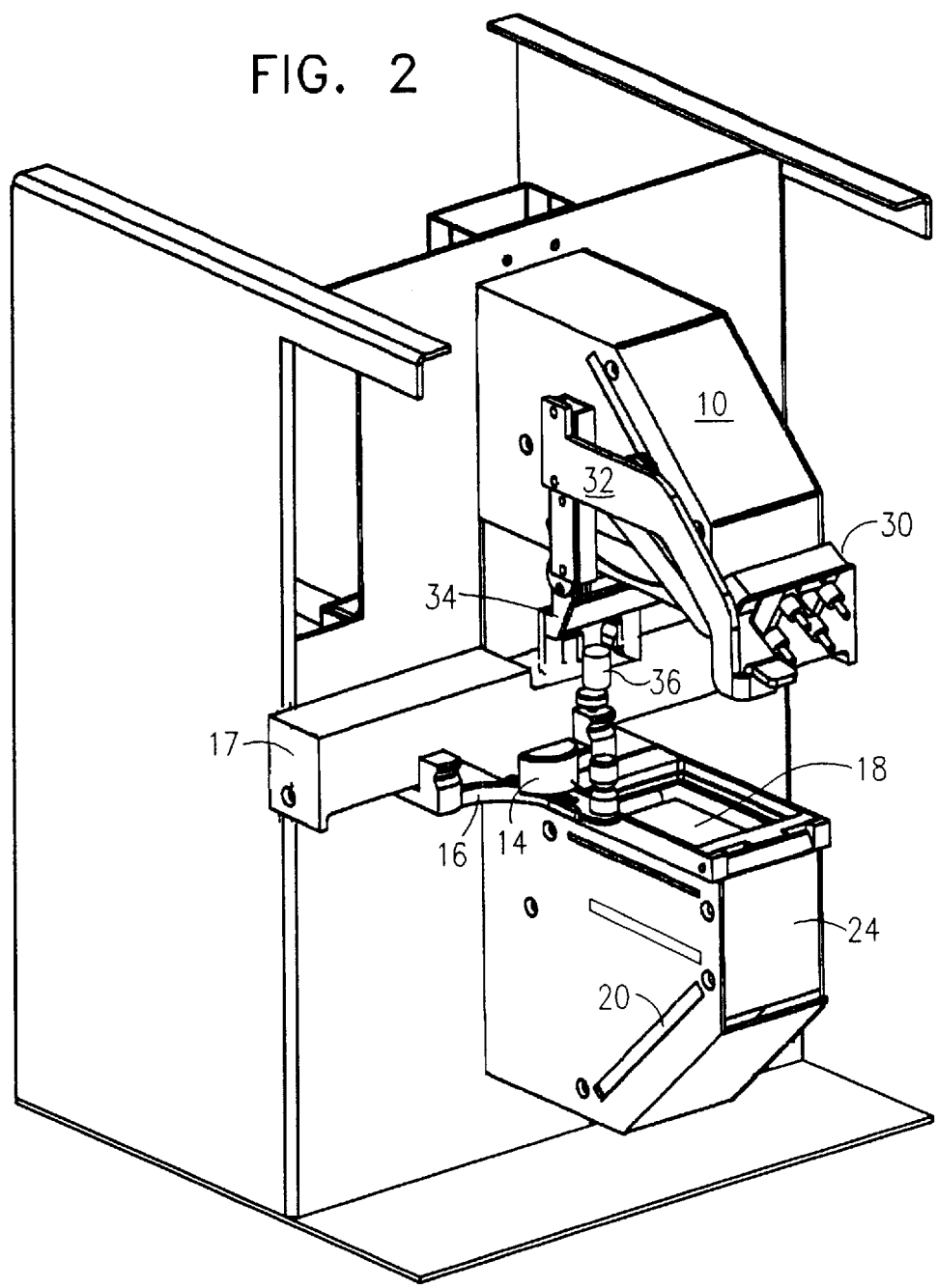

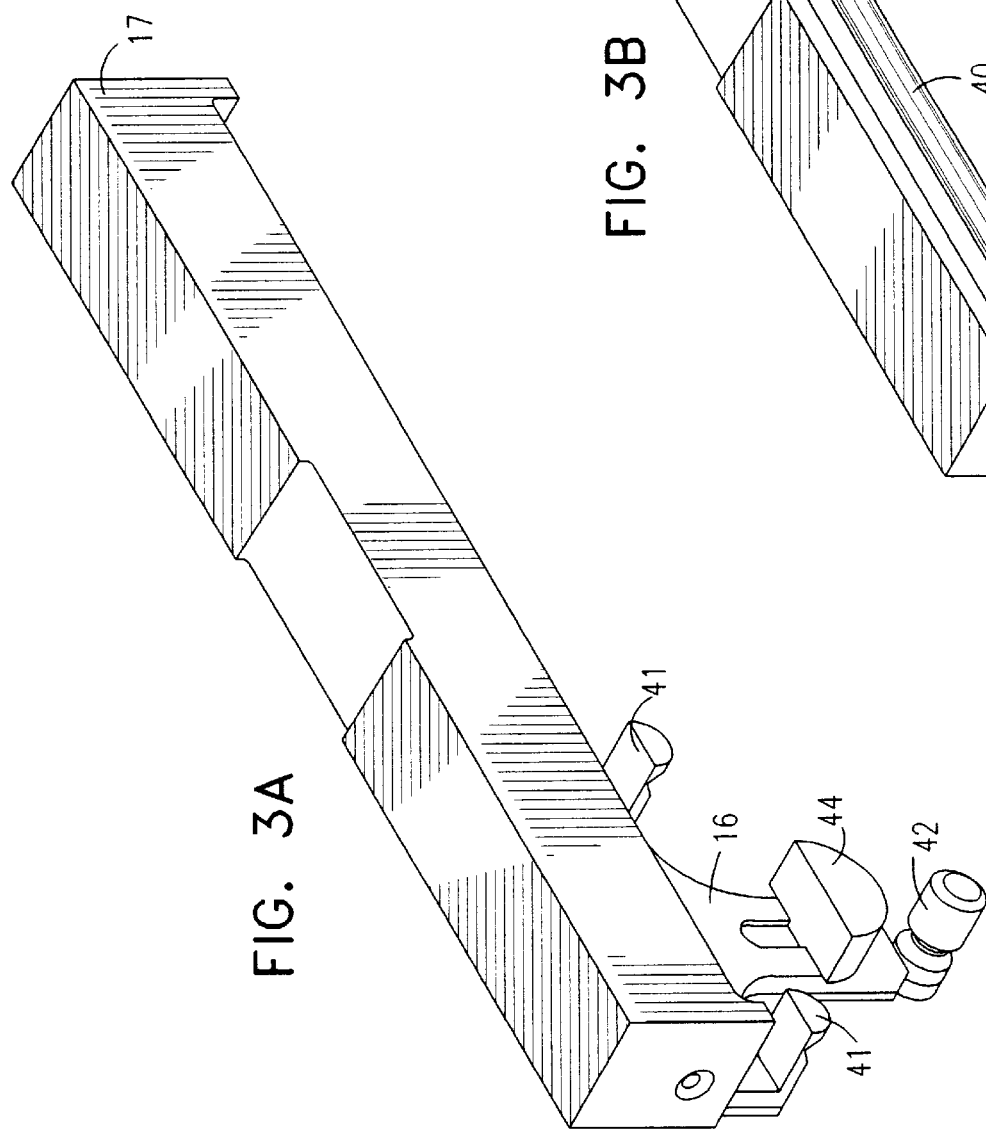

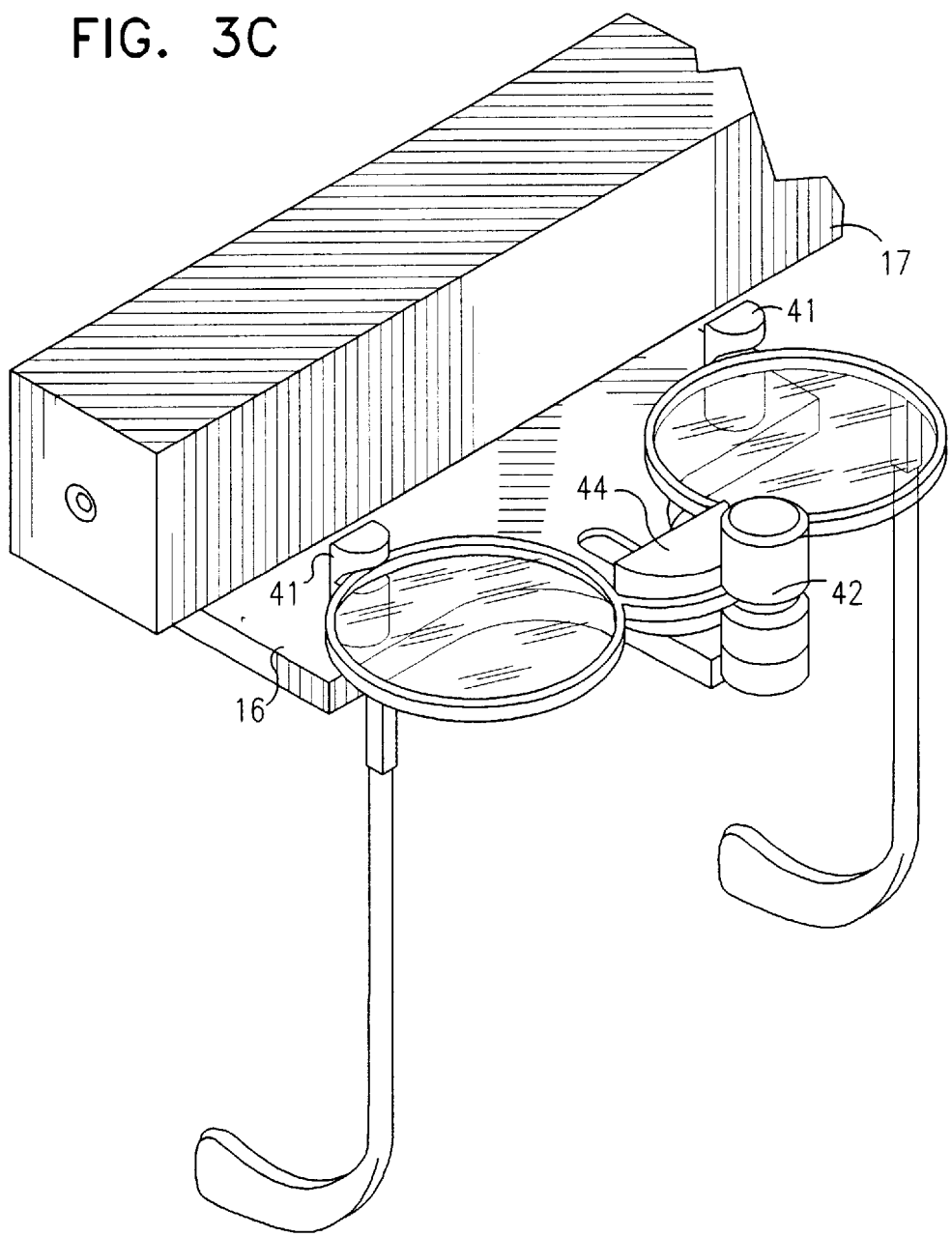

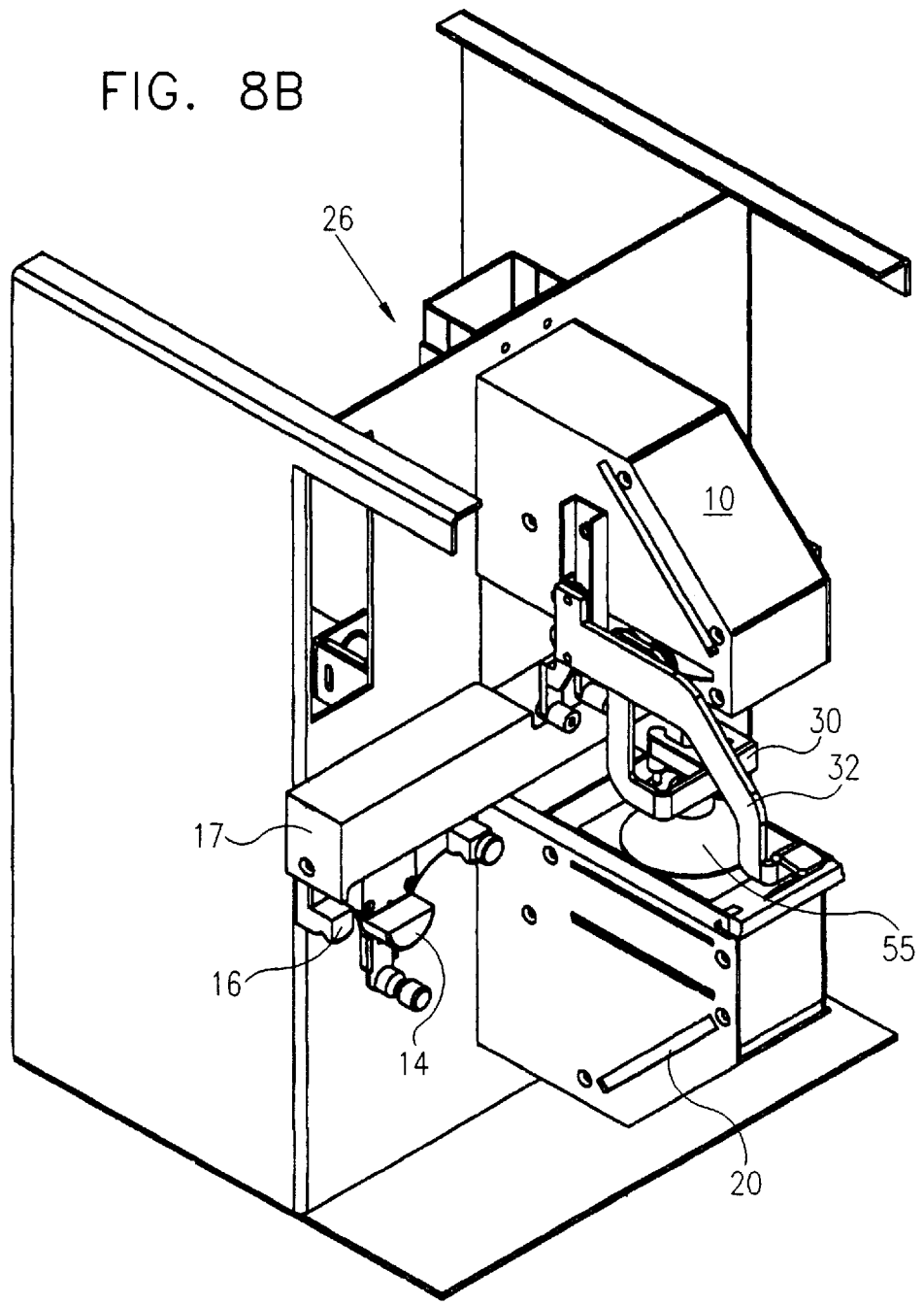

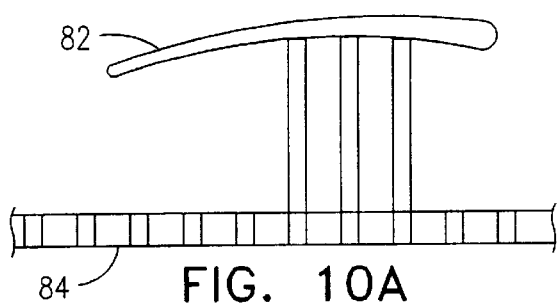
FIG. 10A
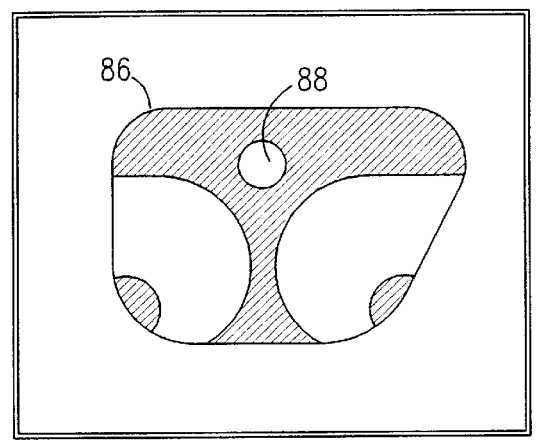
FIG. 10D
FIG. 10E
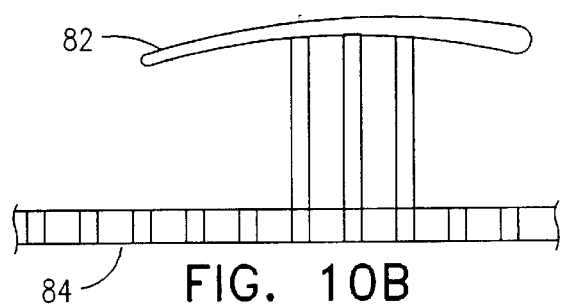
FIG. 10B
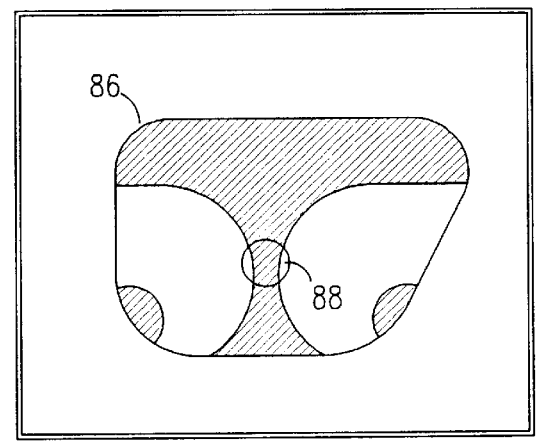
FIG. 10F
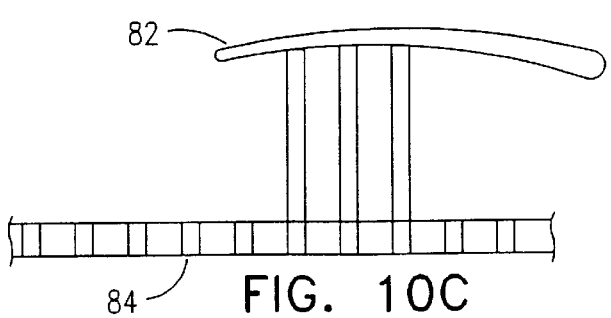
FIG. 10C
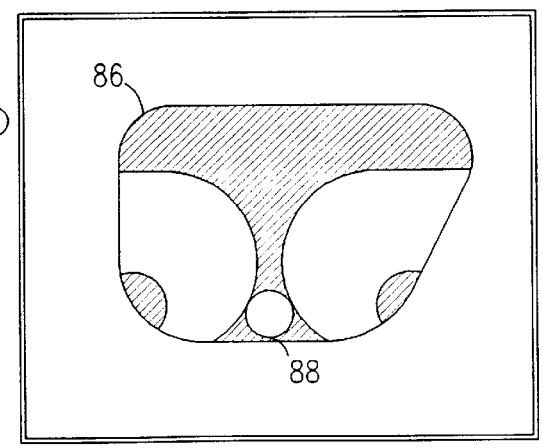

FIG. 11
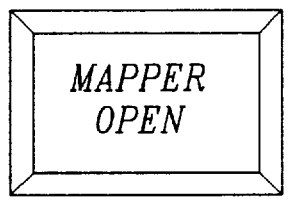
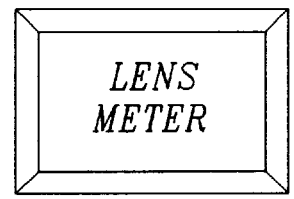

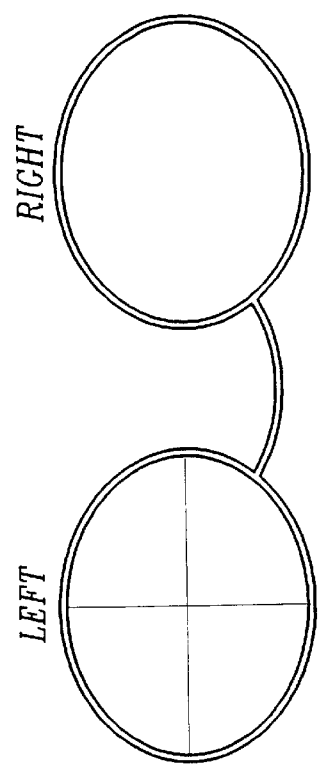
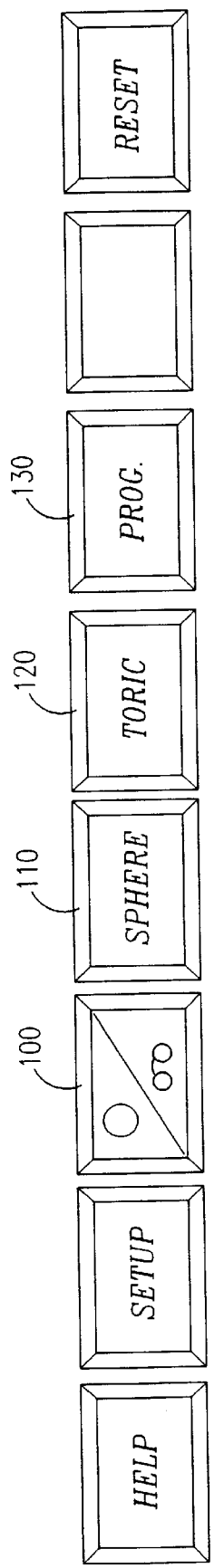
FIG. 12

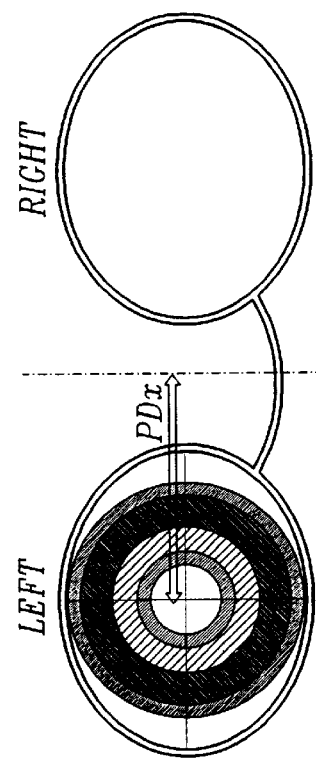
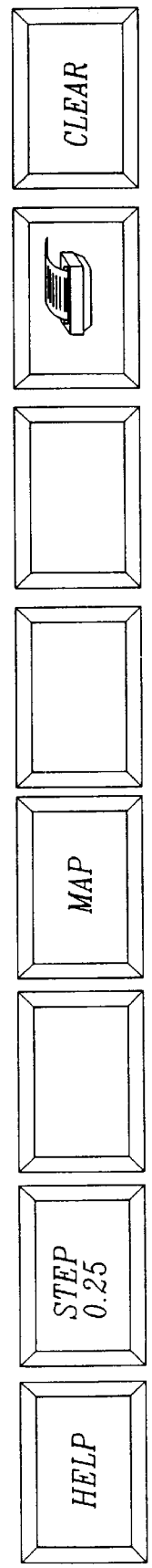
FIG. 13A

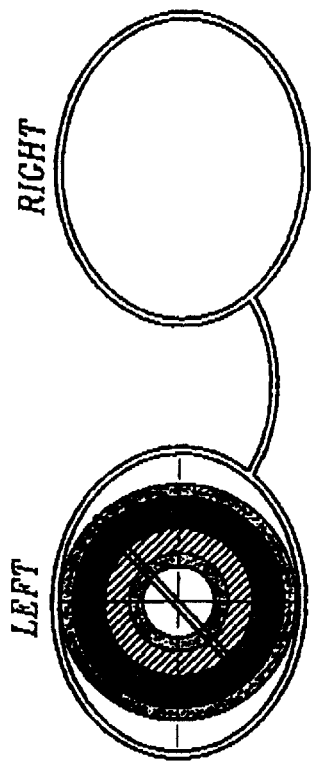
FIG. 14A
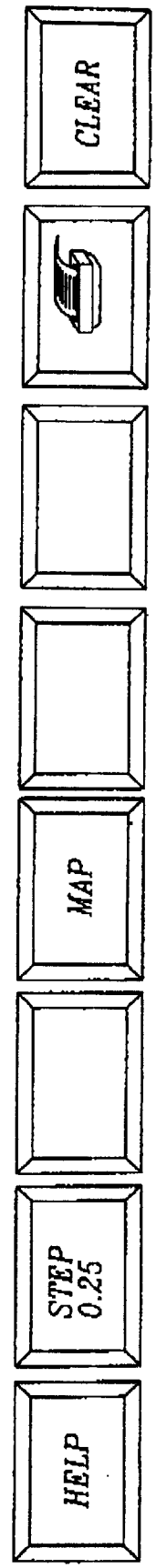

FIG. 14B
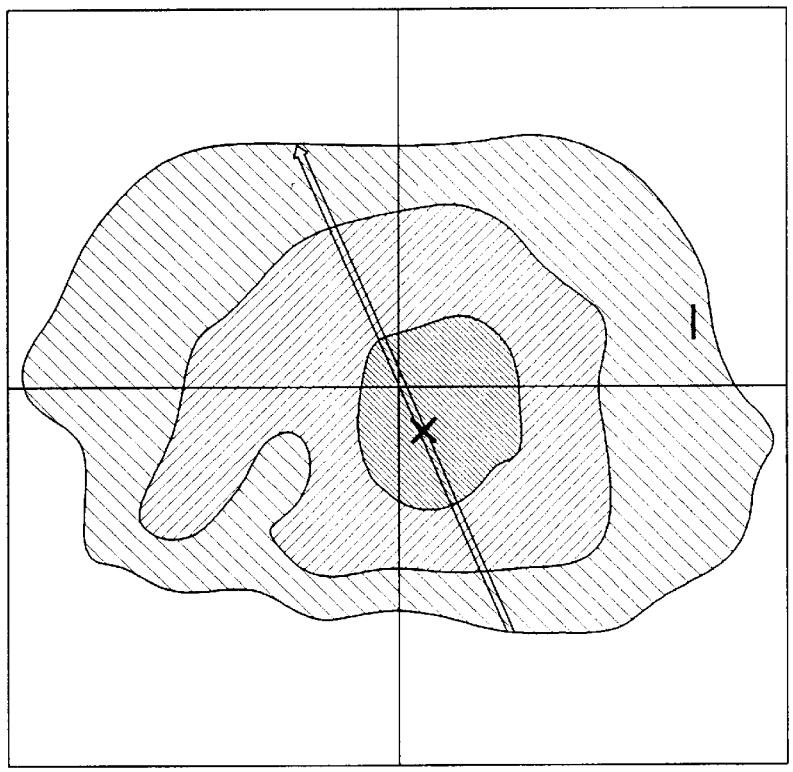
RIGHT
LEFT
SPH = +7.50
CYL = -1.32
AXS = +30
PRS = +0.5
SPHERE MAP: +7.50 +7.63 +7.75
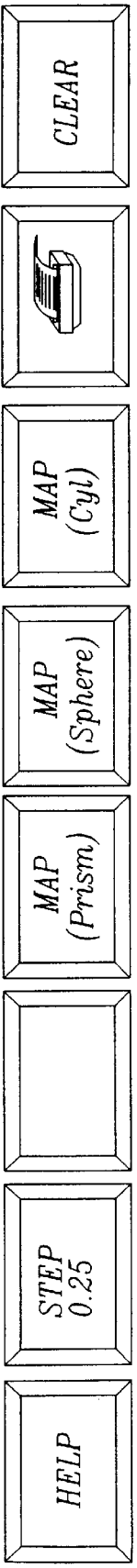

FIG. 15
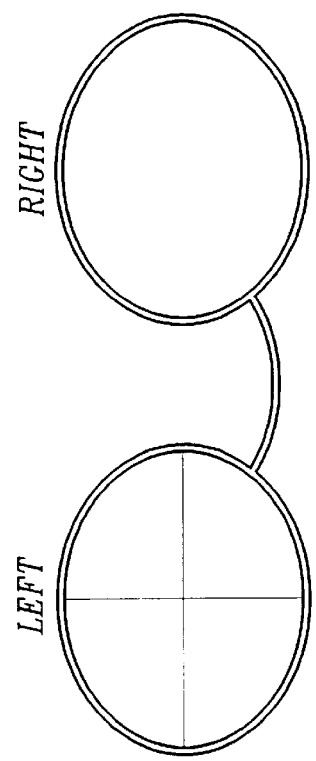
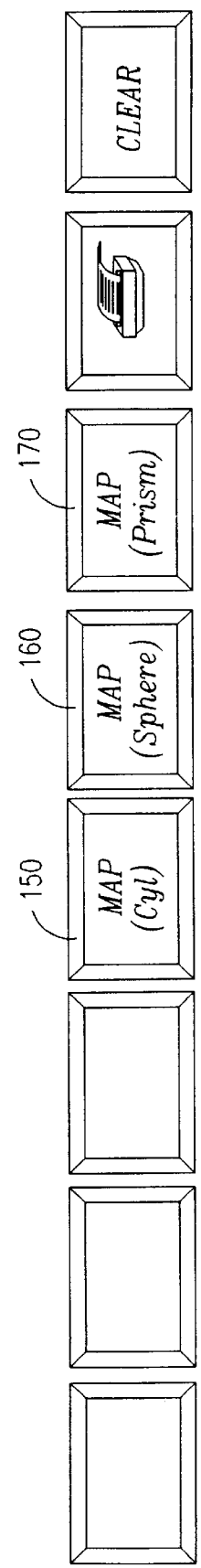

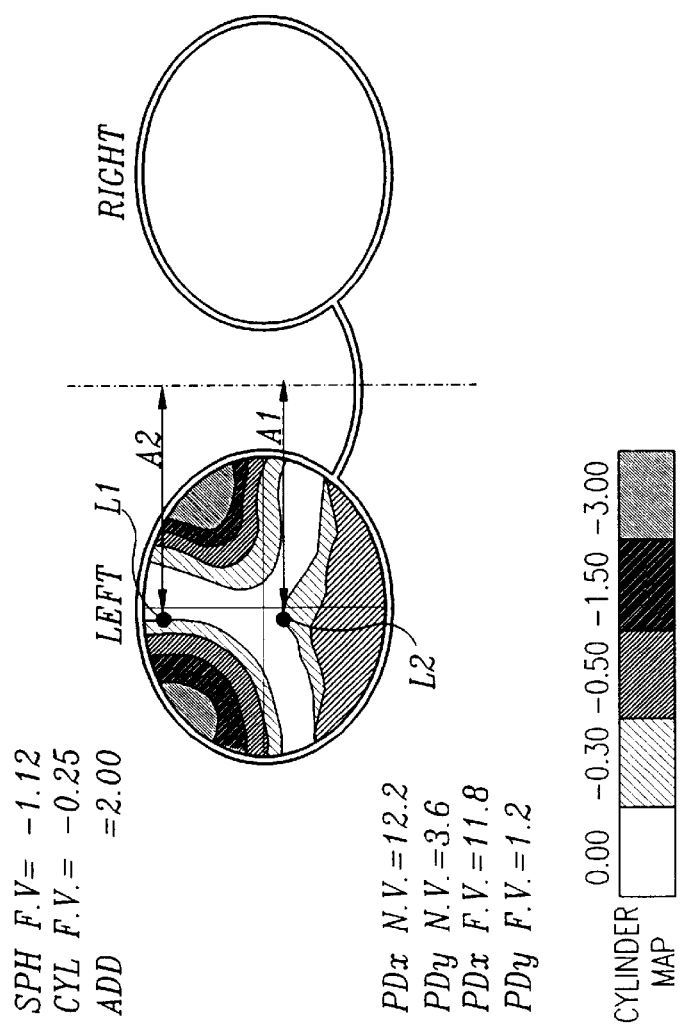
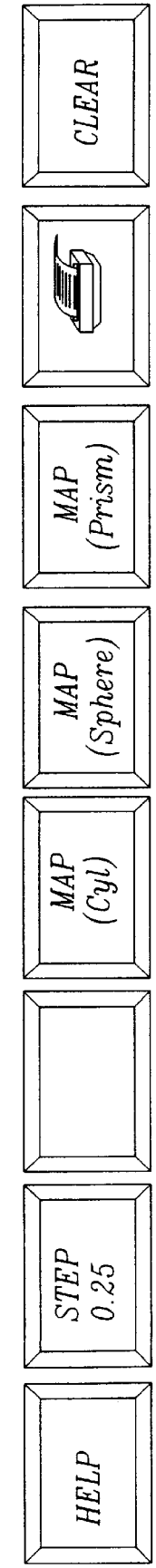
FIG. 16

FIG. 17
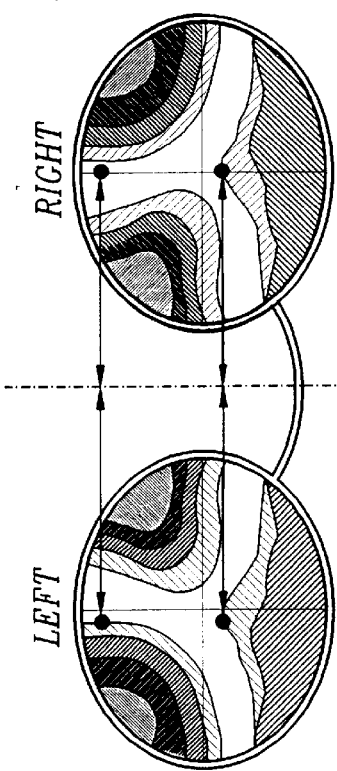
SPH F.V. = -1.50
CYL F.V. = 0.00
ADD = 1.50
PDx N.V. = 31
PDy N.V. = 10
PDx F.V. = 32
PDy F.V. = 25
SPH F.V. = -1.12
CYL F.V. = -0.25
ADD = 1.00
PDx N.V. = 12.2
PDy N.V. = 3.6
PDx F.V. = 11.8
PDy F.V. = 1.2
CYLINDER MAP  0.00  -0.30  -0.50  -1.50  -3.00
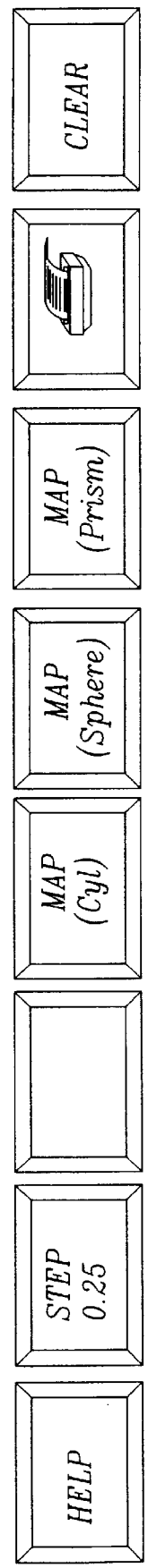

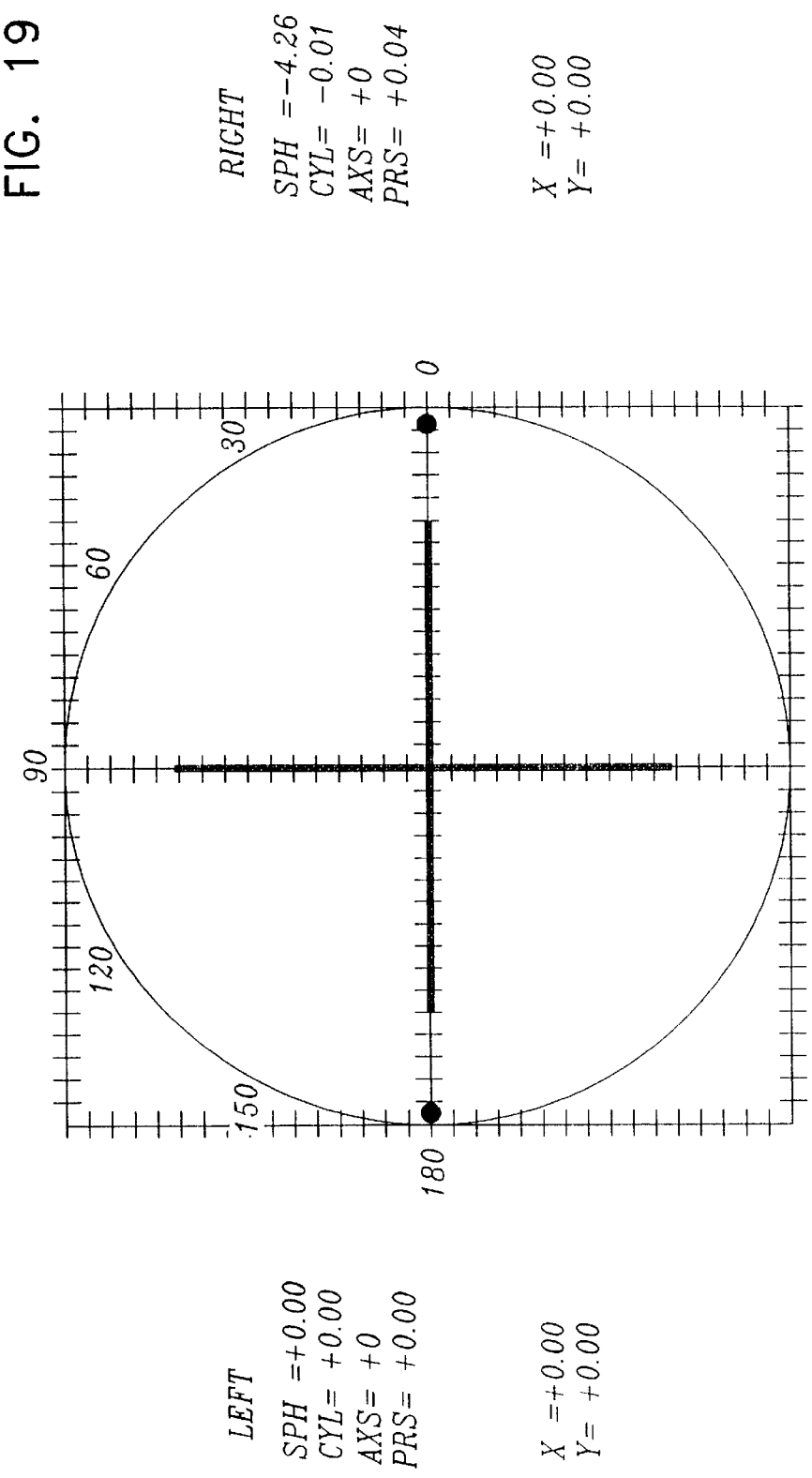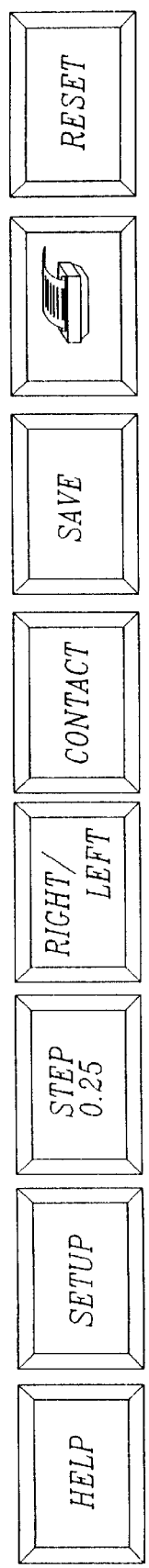
FIG. 19

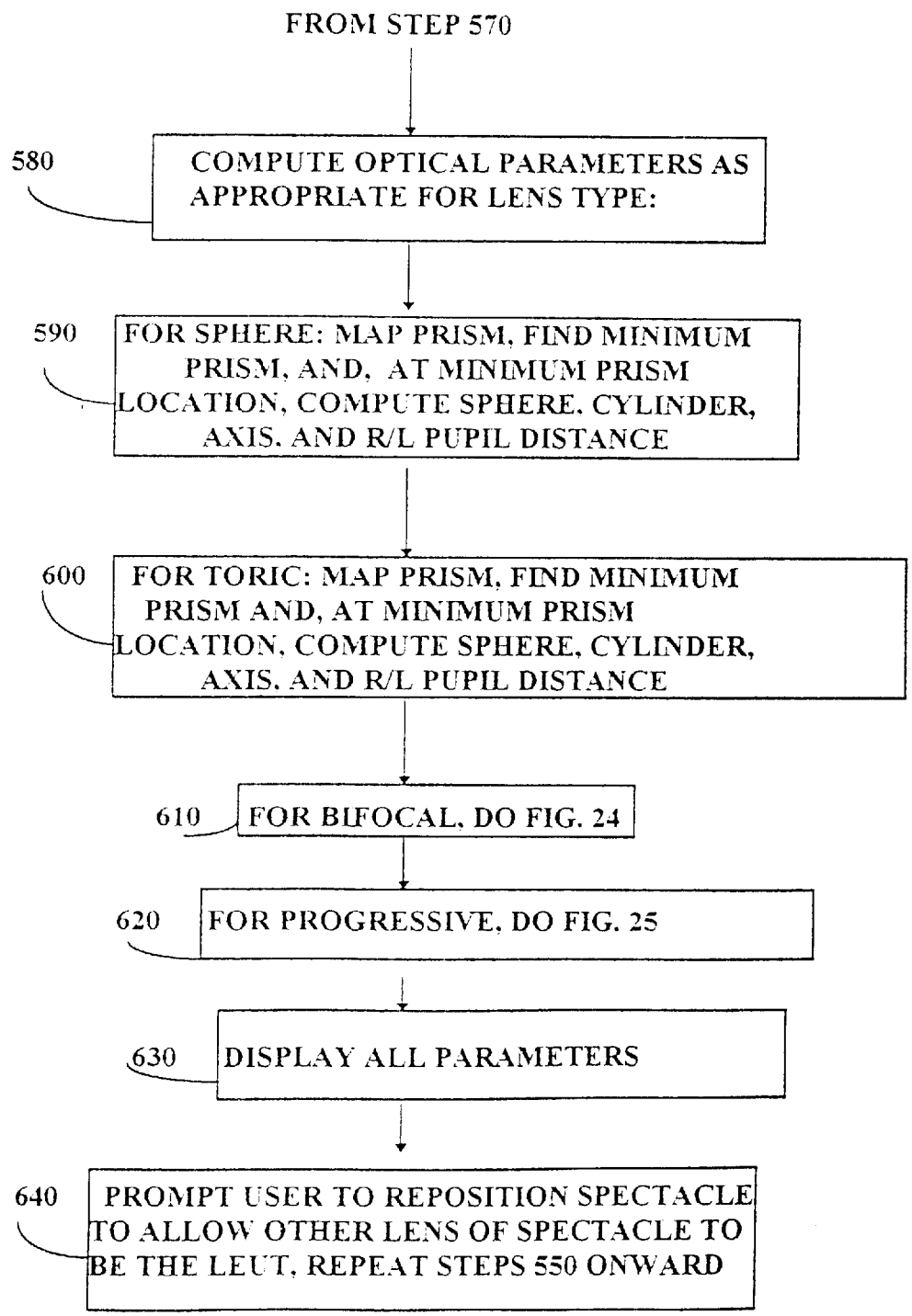

METHODS AND APPARATUS FOR MEASURING AND MAPPING OPTHALMIC ELEMENTS

FIELD OF THE INVENTION

The present invention relates to the field of the measurement and mapping of optical elements in general, and especially ophthalmic lenses.

BACKGROUND OF THE INVENTION

A number of prior art measuring systems exist in which the power, axis, prism and other characteristics of ophthalmic lenses are measured at local points on the lens. Commercial instruments for performing this are available from Humphrey Instruments Corporation of San Leandro, Calif., who produce an automatic lensmeter based on the four beam Hartmann method, from the Nidek Company, of Gamagori, Japan, who use dynamic positioning of the detector to locate the focal position of the probe beam, and the Topcon Company of Tokyo, Japan whose instrument also uses dynamic positioning.

The prior art Hartmann measurement of spectacle lens power at a localized area on the lens uses four measurement beams. The four beam technique is used in all of the previously available commercial instruments for measuring ophthalmic lens power, such as those mentioned above. The technique is described in an article by D. and Z. Malacara entitled "Testing and centering of lenses by means of a Hartmann test with four holes" published in Optical Engineering, Vol. 31, No. 7, pp. 1551–1555 (July 1992). Since it is difficult to discriminate between the separate spots resulting from the four beams if detection is made at the focal plane of the lens under test, one technique used is to detect the position of the beams at a defocused position. Since this introduces inaccuracies into the measurement, it is preferable to measure the four beams at the focal plane, but these measurements must then be performed separately and sequentially.

This can be achieved by a number of methods, four of which are described by the Malacara's. They propose using either (i) a rotating chopper which exposes only one beam at a time, or (ii) a laser beam scanner which projects beams sequentially, or (iii) four separate light sources (such as LEDs), with a small circular diaphragm at the focus of the lens, the separate sources being lit and extinguished sequentially, or (iv) separate light sources as in method (iii) but with small lenses in front of each of them.

The four-beam technique enables the determination of two radii of curvature, and of one angle of reference in the lens. This is sufficient for measuring the power of spherical lenses anywhere on their surface, and to determine lens decentering or coma. It is also useful for measuring the power of aspheric lenses near their optical center. However, it cannot detect spherical aberrations of second order or higher, since there are more parameters to be measured than beams. Therefore, off-axis measurements such as the high order spherical aberration, or the coma of complex lens forms, which require higher order Zernicke polynomial analysis, cannot be performed using the prior art four-beam Hartmann methods.

Such measurements can be performed by instruments developed for mapping the optical characteristics of the whole surface of ophthalmic lenses, which also thereby enable such characteristics as toric axis and corridor direction to be determined on more complex lenses. Commercial instruments for performing this are available from Rotlex 1994 Ltd., of Dimona, Israel, whose instrument is based on the Moire effect, and enables mapping of optical elements by means of measurement of the Moire Deflectometry effect of the grating, from Automation and Robotics S. A. of Brussels, Belgium, who measure the deformation of a grid, and from the assignees of the current invention, Visionix Limited of Jerusalem, Israel, whose instrument is based on a computerized Hartmann measurement using a large number of beams, as described in the copending published PCT Application No. PCT/EP95/02283 (Publication No. WO95/34800) mentioned above.

Prior art methods for measuring the optical characteristics of complete pairs of spectacles are limited to measurement of the distance between the optical centers of the two lenses within their frames, known as the inter-pupil distance of the lenses, or the distance from the optical center of each lens to the bridge center line. These measurements can be performed using a number of prior art instruments, such as that offered by Humphrey Instruments Incorporated of San Leandro, Calif., which is based on U.S. Pat. No. 4,098,002, by Campbell et al., and that offered by the Nidek Company Limited of Gamagori, Japan, which is based on U.S. Pat. No. 5,152,067, by Kurachi et al.

On the other hand, the full optical characteristics of each lens are only measured separately and independently of their mounting position in the spectacle frames, by one of the above mentioned mapping instruments. This is a serious limitation of the prior art methods, since even though each individual lens may be correctly manufactured, and the lenses mounted with the correct inter-pupil distance, they may be incorrectly cut, asymmetrically mounted or incorrectly orientated within the frame. none of which faults are detectable by the prior art systems. Such errors are a serious cause of user fatigue and non-tolerance. This phenomenon is especially prevalent with progressive lenses, which have to be aligned very accurately to be comfortable and useable. Inter-pupil distance measurement, as performed by any of the presently available instruments, does not detect any of these faults.

Furthermore, none of the available prior art inter-pupil measurement instruments mentioned above are able to measure the height of the optical center, or in the case of a progressive lens, optical centers, with respect to the spectacle frames. This distance is also important to ensure comfort in the use of the spectacles. For progressive lenses, accurate measurements of these distances are very critical for correct use of the spectacles.

The alignment of progressive lenses, and to a lesser extent, that of toric lenses too, is so critical that during all stages of their manufacture, marks are made on their surface to define the correct alignment of the optical axes, corridor and center. Since these marks are virtually or completely obliterated during various stages of the manufacturing process, they have to be remade several times during manufacture. The result of these repeated remarkings can manifest itself as a cumulative position and alignment error of the markings with respect to the true optical characteristics of the lens. As a result, when the final lens is cut and mounted into the spectacle frames according to the markings on it, even though it has been manufactured accurately, incorrect marking can be the cause of serious misalignments, both lateral and angular, with respect to the prescribed requirements.

A research program into the accuracy with which spectacles with progressive lenses fulfill the prescribed requirements has been undertaken by the Ophthalmic Appliances Testing Service of the Department of Optometry and Visual Science, City University, London. A preliminary report published in Optical World, May 1997, pp 26–27, has shown, for instance, very large deviations of up to 5 dioptres in the base down prismatic power of the lenses of identically prescribed spectacles. Since, as mentioned previously, errors such as these in fulfilling prescription requirements cause fatigue and non-tolerance for the user, this problem is of a serious nature, and has not been solved by previously available lens measurement and marking systems.

Other conventional ophthalmic measurement systems are described in the following publications:

Published European Patent Application No. 95104527.7 (Publication No. 0 676 629 A2) to Zeiss describes apparatus for measuring the index of refraction of spectacle lenses without measuring the surface geometry of the glass.

U.S. Pat. No. 5,175,594 to Campbell describes a lensmeter with correction for refractive index and spherical aberration.

U.S. Pat. No. 5,307,141 to Fujieda describes apparatus for measuring the refractive characteristics of a spectacle lens.

U.S. Pat. No. 5,339,151 to Shinn describes a spectrometer incorporated to a conventional lensometer.

U.S. Pat. No. 5,469,261 to Hellmuth et al describes a method and apparatus for measuring curvature of lens surfaces, physical thickness of lens, and the index of refraction of the lens.

Copending Published PCT Application No. PCT/EP95/02283 (Publication No. WO 95/34800) describes apparatus for mapping an optical element, the apparatus including a light source arranged to transmit a light beam toward the optical element, a beam separator including a plurality of beam separating elements operative to separate the light beam into a corresponding plurality of light beam portions, an optical sensing device operative to generate a light spot map including a plurality of light spots corresponding to the plurality of beam separating elements and an optical element characteristic computation device operative to derive at least one characteristic of the optical element from the light spot map and including apparatus for identifying the beam separating element corresponding to an individual spot based at least partly on information other than the location of the spot.

The focimeter is a conventional device for measuring optical characteristics of spectacle lenses. The focimeter measures the focal length at any point on each of the spectacles' lenses.

The disclosures of all publications mentioned in this section and in the other sections of the specification, and the disclosures of all documents cited in the above publications, are hereby incorporated by reference.

SUMMARY OF THE INVENTION

The present invention seeks to provide apparatus and methods for evaluating functionality of spectacles.

The present invention also seeks to provide an improved ophthalmic lens measurement instrument, which overcomes the disadvantages and drawbacks of existing instruments, especially with respect to the ability of the instrument to regard each lens as part of a complete integrated optical system, namely the spectacles, and to perform a range of measurements and tests on the lenses as part of a pair of spectacles.

The present invention also seeks to provide a plotter for marking LEUTs (lenses under test) preferably in conjunction with apparatus for mapping ophthalmic lenses.

The present invention also seeks to provide improved methods and apparatus for mapping ophthalmic characteristics of spectacle lenses.

The present invention also seeks to provide apparatus for ophthalmic inspection in which a negative lens diverges rays impinging on a lens to be tested and aberration compensation is provided computationally. Advantages of this apparatus are that the lensmeter may be static and that the same apparatus can provide mapping functions as well as conventional lensmeter functions.

There is thus provided, in accordance with a preferred embodiment of the present invention, a method for providing optical information regarding spectacles in which are mounted first and second lenses, the method including computing a map, within a single coordinate system, of at least one optical characteristic over both of the two lenses, and providing an output indication of optical information related to the map.

Further in accordance with a preferred embodiment of the present invention, the step of computing a map includes generating an image of the first lens using an imaging device, changing the position of the second lens relative to the imaging device by a predetermined distance such that at least a portion of the second lens enters the entrance aperture of the imaging device and generating an image of at least a portion of the second lens, and combining the images into the map, using the predetermined distance.

Still further in accordance with a preferred embodiment of the present invention, the step of changing position includes moving the second lens relative to the imaging device by a fixed distance; and the predetermined distance comprises a fixed distance.

Further in accordance with a preferred embodiment of the present invention, the step of computing a map includes imaging the first lens with a first imaging device, and imaging the second lens with a second imaging device positioned a fixed distance away from the first imaging device; and combining the image of the first lens with the image of the second lens into the map.

Still further in accordance with a preferred embodiment of the present invention, the step of computing a map includes providing an imaging device whose entrance aperture is large enough to image the first and second lenses, while the spectacles are stationary, and imaging the first and second lenses, while the spectacles are stationary, using the imaging device.

Still further in accordance with a preferred embodiment of the present invention, the step of computing a map includes providing an imaging device whose entrance aperture is large enough to image the first and second lenses simultaneously, and imaging the first and second lenses simultaneously using the imaging device.

Further in accordance with a preferred embodiment of the present invention, the optical information related to the map includes the map itself.

Still further in accordance with a preferred embodiment of the present invention, the optical information related to the map includes optical information derived from the map.

Further in accordance with a preferred embodiment of the present invention, the at least one optical characteristic include characteristics pertaining to at least one of the following: spherical power (also termed sphere herein), cylindrical power (also termed cylinder herein), cylinder axis (also termed axis herein), prism, coma, far vision, near vision, and any local lens characteristic.

Still further in accordance with a preferred embodiment of the present invention, the step of computing a map includes aligning the first lens with respect to the entrance aperture of an imaging device and generating an image of the first lens, changing the relative positions of the spectacles and the imaging device by a variable known distance so as to align the second lens with respect to the entrance aperture of an imaging device and generating an image of the second lens, and combining the images into the map, using the variable known distance.

Also provided, in accordance with another preferred embodiment of the present invention, is apparatus for providing optical information regarding spectacles in which are mounted first and second lenses, the apparatus including a spectacles mapper operative to compute a map, within a single coordinate system, of at least one optical characteristic over both of the two lenses, and a spectacles analyzer operative to provide an output indication of optical information related to the map.

Further provided, in accordance with still another preferred embodiment of the present invention, is a lens marking device including a lens marker operative to mark at least one locations on a lens and initially occupying a particular position relative to a lens to be marked, and a lens orientation device operative, at least once, to automatically change the position of the lens marker relative to the lens, thereby to allow the lens marker to mark at least one specific location from among the at least one location.

It is appreciated that the lens orientation device may move the lens marker and the lens and its supporting device may remain stationary. Alternatively, the lens marker may remain stationary and the lens and its supporting device may be moved by the lens orientation device. Alternatively, some degrees of freedom may be provided by moving the lens marker and other degrees of freedom may be provided by moving the lens and its supporting device.

The location or locations marked by the lens marker may be point locations or alternatively at least one of the locations may include a line or circle or even an entire area or an entire pattern.

Further in accordance with a preferred embodiment of the present invention, the lens marking device also includes a lens analyzer operative to generate control information defining at least one of the at least one locations to be marked and to provide the control information to the lens orientation device, and wherein the lens orientation device automatically changes the position of the lens marker in accordance with the control information.

Still further in accordance with a preferred embodiment of the present invention, the lens analyzer includes an optical lens analyzer operative to determine at least one optical characteristic of the lens and to determine at least one of the at least one locations to be marked, based at least partly on the at least one optical characteristic.

Further in accordance with a preferred embodiment of the present invention, the lens includes a spheric lens and the at least one optical characteristic includes characteristics pertaining to at least one of the following: sphere and prism.

Still further in accordance with a preferred embodiment of the present invention, the lens includes a bifocal lens and the at least one optical characteristic includes characteristics pertaining to at least one of the following: far vision and near vision points, sphere, cylinder, axis, prism and coma.

Additionally in accordance with a preferred embodiment of the present invention, the lens includes a toric lens and wherein the at least one optical characteristic includes at least one of the following: a zero prism location and a cylindrical axis.

Further in accordance with a preferred embodiment of the present invention, the lens includes a progressive lens and the at least one optical characteristic includes characteristics pertaining to at least one of the following: corridor, far vision and near vision points, sphere, cylinder, axis, prism and coma.

Still further in accordance with a preferred embodiment of the present invention, the lens orientation device is operative to automatically change the position of the lens marker based at least partly on at least one optical characteristic of the lens.

Also provided, in accordance with another preferred embodiment of the present invention, is apparatus for measuring an optical characteristic of a location within a lens, the optical characteristic being a multiparametric function of at least a portion of a vicinity of the location, the apparatus including a vicinity analyzer operative to generate lens location vicinity characterizing information by simultaneously analyzing more than four light rays impinging upon the corresponding more than four locations within the vicinity, the vicinity analyzer including a negative lens operative to diverge the light rays impinging upon the more than four locations, the negative lens introducing aberrations, an imager operative to generate an image of the diverged light rays impinging upon the lens, an image analyzer operative to generate the vicinity characterizing information while compensating for the aberrations by performing negative ray tracing, and an optical characteristic computation unit operative to compute the optical characteristic of the location within the progressive lens based on the lens location vicinity characterizing information.

Light ray analysis may be effected by analyzing those rays which reflect off the lens and/or by analyzing those rays which are transmitted through the lens.

Further in accordance with a preferred embodiment of the present invention, the plurality of locations includes more than four locations, and preferably at least 9 locations.

Still further in accordance with a preferred embodiment of the present invention, the lens includes a progressive lens.

Also provided, in accordance with another preferred embodiment of the present invention, is apparatus for inspecting ophthalmic lenses including a first removable LEUT holder including a first Hartmann plate having a smaller number of holes and a negative lens, a second removable LEUT holder including a second Hartmann plate having a larger number of holes, preferably not including a negative lens, and a single optical inspection system for inspecting a LEUT mounted on either one of the removable LEUT holders, having two inspection modes including a mapping mode in which at least one optical parameter of the LEUT is mapped and a lensmeter mode, wherein the negative lens is positioned to diverge rays defined by the Hartmann plate and passing through the LEUT, thereby to facilitate operation of the optical inspection system when operating in the lensmeter mode.

Additionally in accordance with a preferred embodiment of the present invention the second removable LEUT holder does not include a negative lens.

Also provided, in accordance with another preferred embodiment of the present invention, is apparatus for providing optical information regarding spectacles in which are mounted first and second lenses, the apparatus including a spectacles analyzer operative to compute optical information characterizing both lenses of the spectacles, and a prescription analyzer operative to receive a spectacles prescription, compare the spectacles prescription with the optical information, and generate an output indicating whether or not the spectacles comply with the spectacles prescription.

Also provided, in accordance with yet another preferred embodiment of the present invention, is apparatus for providing optical information regarding an ophthalmic lens, the apparatus including a light source generating an incident measuring beam, a Hartmann plate including a plurality of holes, a lens support operative to support the lens such that the lenses' back surface is substantially perpendicular to the incident measuring beam, and is disposed at a predetermined distance in front of the Hartmann plate, a lens analyzer operative to generate optical information regarding the lens by analyzing light rays transmitted through the lens and through the plurality of holes in the Hartmann plate, and an optical information display unit operative to provide an output indication of the optical information.

Further in accordance with a preferred embodiment of the present invention, the lens support consists of three rods of substantially equal length projecting perpendicularly from the Hartmann plate, or of at least part of a cylinder projecting from the Hartmann plate such that its axis is perpendicular to the plate.

Further in accordance with another preferred embodiment of the present invention, the lens analyzer simultaneously generates optical information from a first portion of the ophthalmic lens to provide lensmeter measurement functionality, and optical information from a second portion of the ophthalmic lens to provide mapping functionality.

Still further in accordance with another preferred embodiment of the present invention, the lens support includes three rods of substantially equal length projecting perpendicularly from the Hartmann plate.

Additionally in accordance with another preferred embodiment of the present the lens support comprises at least part of a cylinder projecting from the Hartmann plate such that its axis is perpendicular to the plate.

There is also provided in accordance with yet another preferred embodiment of the present invention, a method for providing optical information regarding an ophthalmic lens, the method including illuminating the lens with an incident measuring beam, supporting the lens on a Hartmann plate comprising a plurality of holes, and including a lens support operative to support the lens such that the lenses' back surface is substantially perpendicular to the incident measuring beam, and is disposed at a predetermined distance in front of the Hartmann plate, analyzing light rays transmitted through the lens and through at least three of the plurality of holes in the Hartmann plate, to provide a lensmeter measurement functionality, analyzing light rays from a portion of the ophthalmic lens to provide mapping measurement functionality, and providing output indication of the lensmeter measurement and the mapping measurement simultaneously on one display unit.

BRIEF DESCRIPTION OF THE DRAWINGS

The present invention will be understood and appreciated more fully from the following detailed description, taken in conjunction with the drawings, in which:

FIG. 2 is an isometric view from the left hand side of the system shown in FIG. 1.

FIGS. 3A and 3B show the construction of the spectacle support clamp and slide mechanism. FIG. 3A is an isometric view from the top, and FIG. 3B from the bottom. FIG. 3C shows the apparatus of FIG. 3A in an operative, spectacles-clamping orientation.

FIG. 4A shows the spectacles clamped in the left orientation, while FIG. 4B shows the right orientation.

FIG. 7A shows a matrix plate used for the lensmeter mode of operation. FIG. 7B shows a matrix plate used for the lens mapping mode of operation. FIG. 7C shows a schematic view of a matrix plate used for the lens mapping mode of operation, but with lensmeter rods integrated into the plate, which define the sag lens position as per the ISO requirement.

FIGS. 10A to 10F illustrate how a modified lens mapping matrix plate is used to correlate between lens position and a real time map display of the lens. FIGS. 10A to 10C show the physical positioning of a progressive lens for viewing its far, intermediate and near view areas, while FIGS. 10D to 10F show the resulting displays on the monitor.

FIG. 11 is an initial screen display generated by the system which allows a user to request operation of the mapping functionality of the system of the present invention or of the lensmeter functionality of the system of the present invention;

FIG. 12 is an initial mapping screen display generated by the system if the "mapper open" button of FIG. 11 is selected.

FIG. 13A is a screen display generated if the user indicates, using button 110, that the LEUT or LEUTs are spheric, and further indicates, using button 100, that both lenses in a pair of spectacles are to be tested.

FIG. 14A is a screen display generated if the user indicates, using button 120, that the LEUT or LEUTs are toric, and further indicates, using button 100, that there are two LEUTs, i.e. both lenses in a pair of spectacles, and further places the spectacles in the system in a left orientation.

FIG. 14B is a screen display generated if the user indicates, using button 120, that the LEUT or LEUTs are toric, and further indicates, using button 100, that the LEUT is a single uncut lens rather than a pair of lenses mounted in spectacles;

FIGS. 15–17 are screen displays generated if the user indicates, using button 130, that the LEUT or LEUTs are progressive, and further indicates, using button 100, that the LEUTs include both lenses in a pair of spectacles;

FIG. 19 is an initial screen display generated by the system if the user requests operation of the lensmeter functionality of the system of the present invention, for a single LEUT, using the "lensmeter" control button in FIG. 11;

FIGS. 23A–23B, taken together, form a simplified flowchart illustration of a preferred method for operation of the system of the present invention, in mapper mode, manual lens type detection submode, where the LEUTs comprise a pair of lenses mounted in spectacles;

DETAILED DESCRIPTION OF PREFERRED EMBODIMENTS

Figure 1:
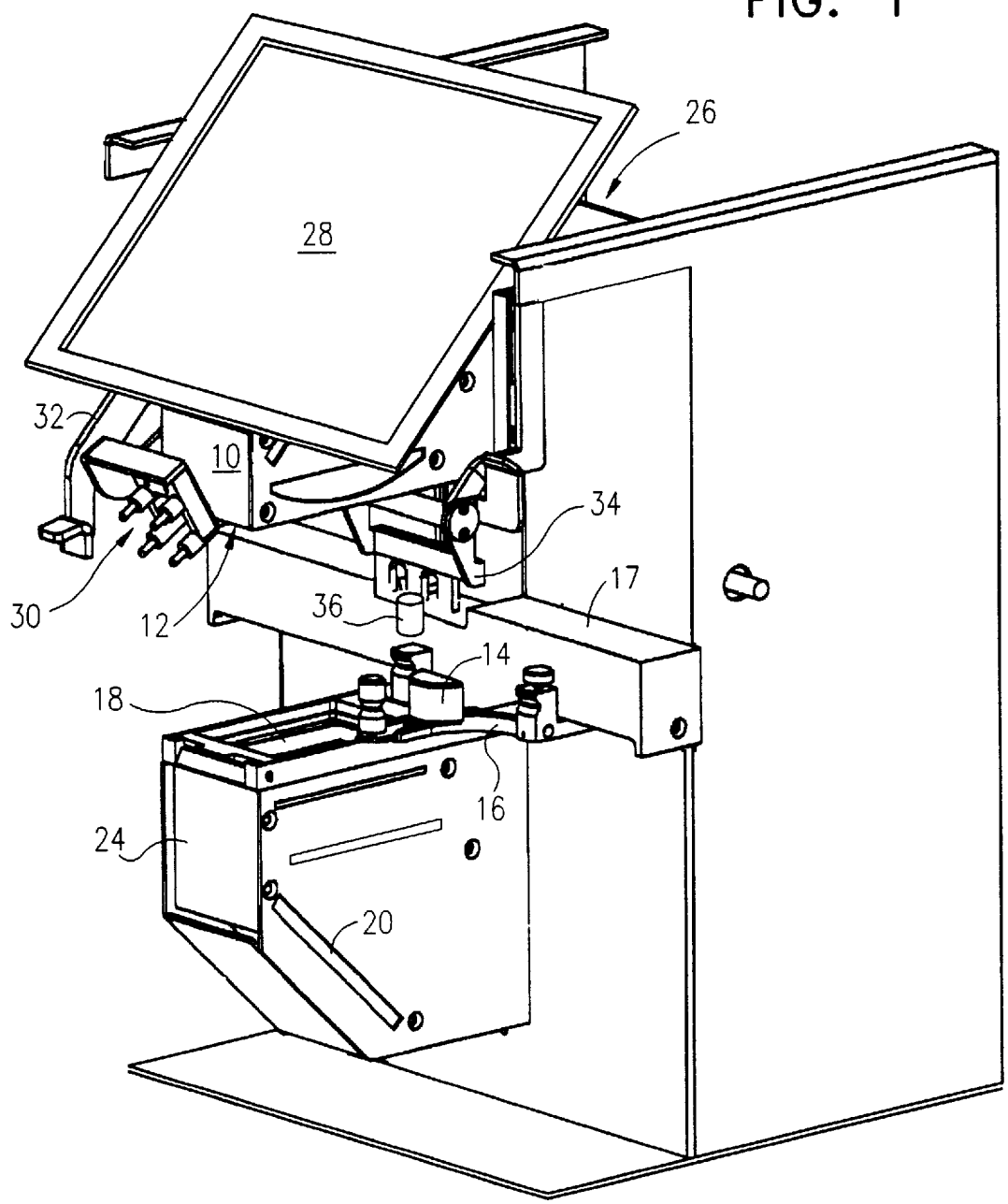
FIG. 1 shows an isometric view of a visual spectacle mapping system, constructed and operative according to a preferred embodiment of the present invention, with the cover removed in order to show internal parts.
Figure 9:
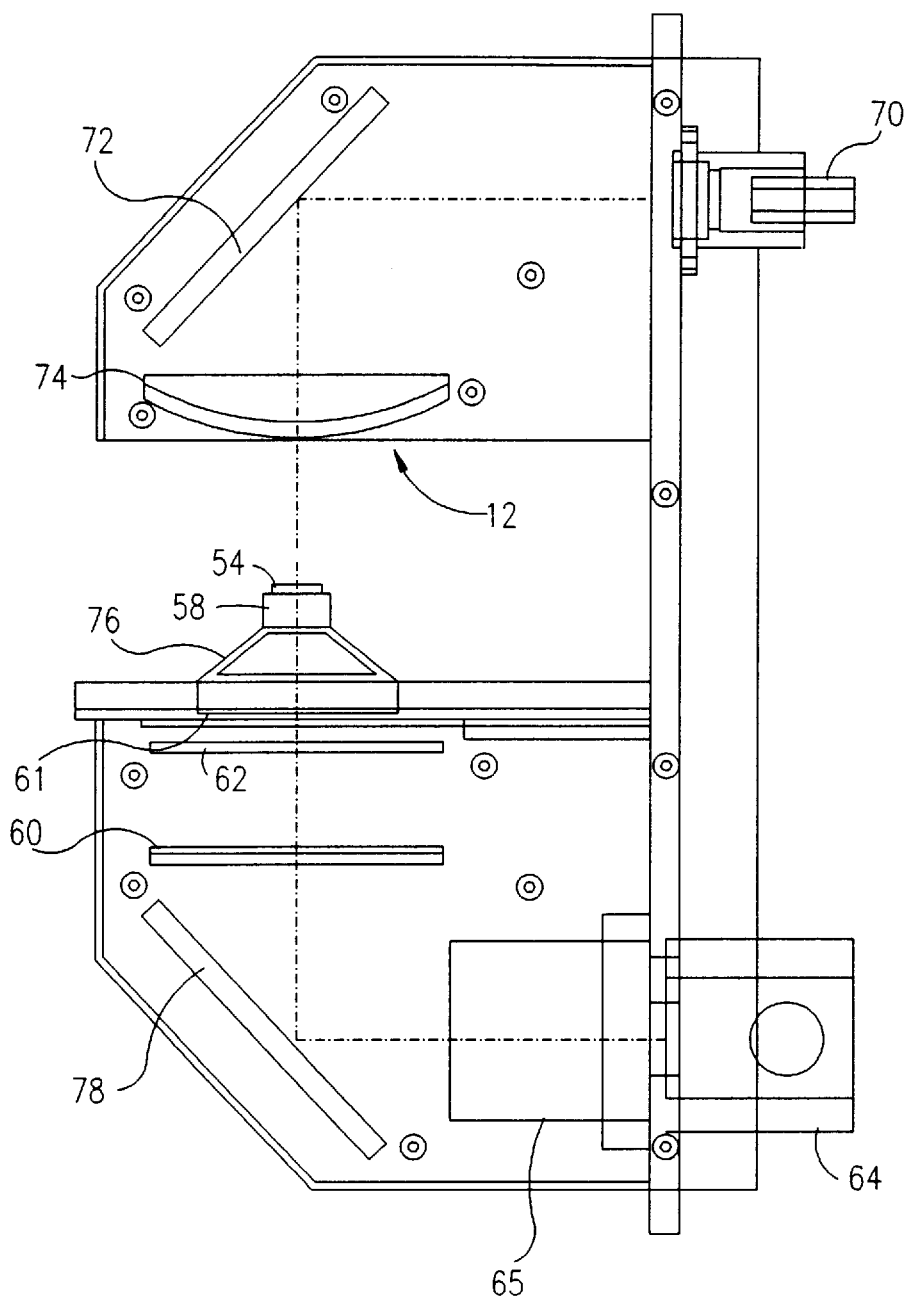
FIG. 9 shows a scale layout of the optical system used in the power measurement embodiment shown in FIG. 6.

Reference is now made to FIG. 1 which shows an isometric view of a visual spectacle mapping system, constructed and operative according to a preferred embodiment of the present invention. The cover of the system has been removed in order to show internal parts. A source of light is located within the housing 10, and the light output is reflected downwards by a protected aluminum 45° beam bending mirror, of dimensions 46×75 mm, and with a flatness of λ/4 over 25 mm, and a 60/40 scratch/dig specification. A collimating lens, of focal length 150 mm and cut to dimensions 46×86 mm to provide compact mounting within the rectangular source housing, then projects a parallel beam of collimated light down from the source housing exit aperture 12. Full details of the optical elements are shown in FIG. 9 below. The source is preferably monochromatic, in the region of 550 nm, near the eye's maximum sensitivity wavelength, but need not be coherent. In this preferred embodiment, a red LED is used as the source, and a dispersion correction made in the software.

The spectacles under test are mounted in a clamp 14 which is mounted on a slide 16 which can be switched between two positions along a support bar 17, such that each lens is brought sequentially into the beam projected from the source, and is separately measured. Details of the spectacle clamp and slide are given below in FIGS. 3A and 3B. After traversing the spectacle lens, the light enters the mapper receiver 24 through the mapper aperture 18. It traverses a passband filter 62 (FIG. 9), such as Schott RG630, used to reject background light and it is imaged on the diffusing plate 60, and is deflected by another 45° beam bender mirror 20, towards a CCD camera 64 such as a Watec Model WAT-902A, fitted with the image focusing optics 65, such as an 8.5 mm, f-1.3 lens model ES-39087 supplied by the Edmund Scientific Company of Barrington N.J. The signal from the CCD camera is processed by an electronic processing and control unit 26, located inside the body of the mapping system, and the resulting information is displayed on a front-mounted monitor 28. The various screens generated on this monitor by the system software in the course of a measurement are described in FIGS. 11 to 19 below.

In this embodiment of the present invention, on either side of the optical source are mounted two additional measurement devices. On the left side is provided a blocker mechanism 30 for holding the lens while performing power measurements. The blocker is mounted on a pivot arm 32, so that it can be swung into place when a lens power measurement is to be performed.

On the right hand side is provided a marking plotter 34, with a marking pen 36. The pen is moved to the desired marking positions by means of a conventional miniature X-Y-Z controlled motion system, such as a system of Model ATS100-50N motion stages, each with 50 mm. travel, available from Aerotech Inc. of Pittsburgh, Pa. The motion system is driven by the output of the processing and control unit 26, according to the measurement results obtained in real time on the lens being marked. The marker can be programmed to mark a variety of identifying marks, from the optical center of a simple spherical lens, to the center and toric axis of a non-spheric lens, or even the corridor position of a progressive lens under test. This embodiment is useful to allow the optician to determine the correct alignment and cutting position of the lenses before mounting in the spectacles. It can further be used when testing completed spectacles at any later date, to confirm that they have been made correctly according to prescription.

FIG. 1 shows the slide 16 in the right hand position, so that the left hand lens of the spectacles may be measured. This is known as the left orientation. FIG. 2 is a view from the left side of the system, showing the slide in the left hand position such that the right hand lens may be measured. This is the right orientation.

In FIGS. 3A and 3B are shown isometric views from the top and bottom respectively of the spectacle support clamp and slide mechanism. The spectacles are clamped, with the top edge of the frames against the two points 41, and the bridge clamped between the pinch roller 42, and the sliding clamp 44. In this manner, the frames are clamped in a unique position by three points which define a plane. The slide 16 travels from side to side along a rail 40, mounted in the support bar 17. The travel of the slide motion is fixed for each application, and is typically 60 mm for adult sized spectacles. The motion is executed by manual or automatic control, with the end positions defined by means of microswitches (not shown) actuated by the slide position. The microswitches also input to the electronic processing and control unit the information as to whether a right or a left lens is being measured.

Figure 4A:
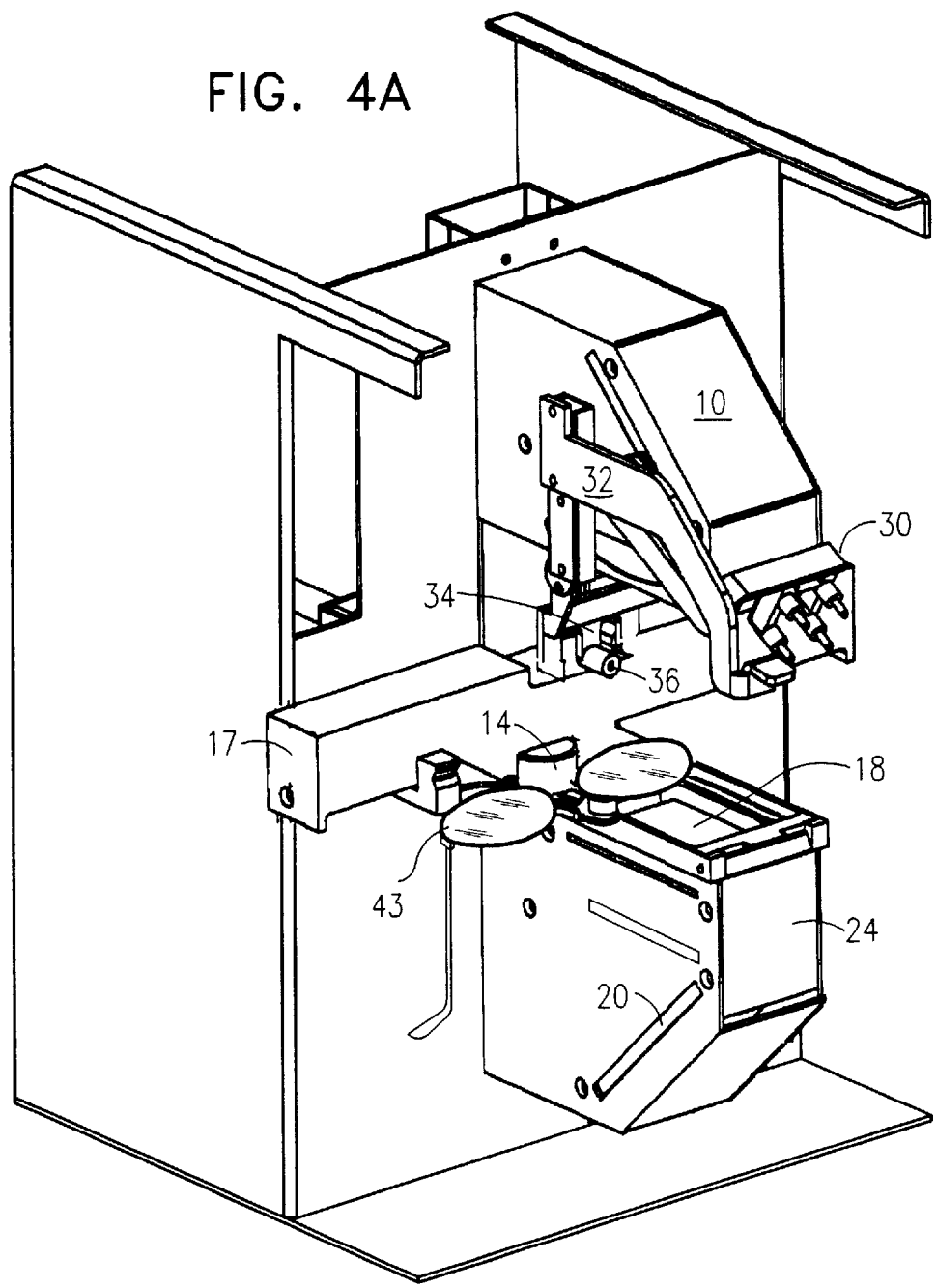
FIGS. 4A and 4B are views of the system shown in FIGS. 1 and 2, showing the method whereby spectacles are clamped for testing in the support clamp shown in FIG. 3.
Figure 4B:
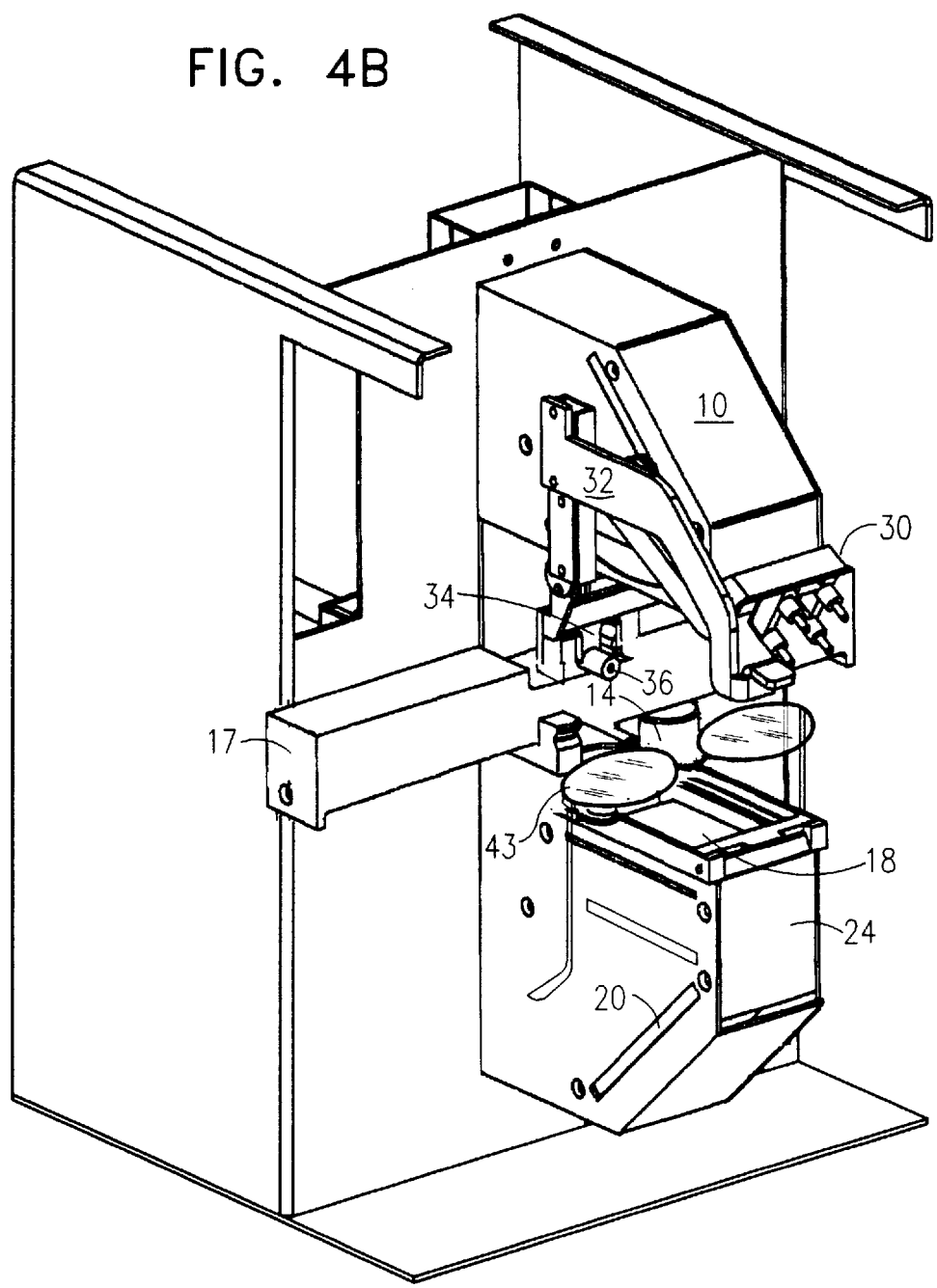

FIGS. 4A and 4B are views of the system shown in FIGS. 1 and 2, showing the method whereby spectacles 43 may be clamped for testing on the slide by the 3-point mechanism shown in FIGS. 3A–3C. FIG. 4A is a general illustration of the spectacles clamped in the left orientation, while FIG. 4B is a general illustration of the spectacles in the right orientation. A preferred scheme for clamping the spectacles is best appreciated with reference to FIG. 3C.

The use of a single reference clamping position for the spectacles, and a slide mechanism for switching between the right and left lens positions enables a significant advantage to be achieved over prior art measurement methods of ophthalmic lenses mounted in spectacles. The prior art methods, with the exception of one instrument which can measure the inter-pupil distance with respect to the spectacle frames, are only able to measure optical characteristics of each lens separately and independently of their mounting position in the spectacle frames. In the present invention since the system software is able to output the orientation of a toric lens or the corridor orientation of a progressive lens with respect to the frame position, it provides a further advantage in that incorrect orientation of each lens within the spectacle frames can be detected.

Figure 5:
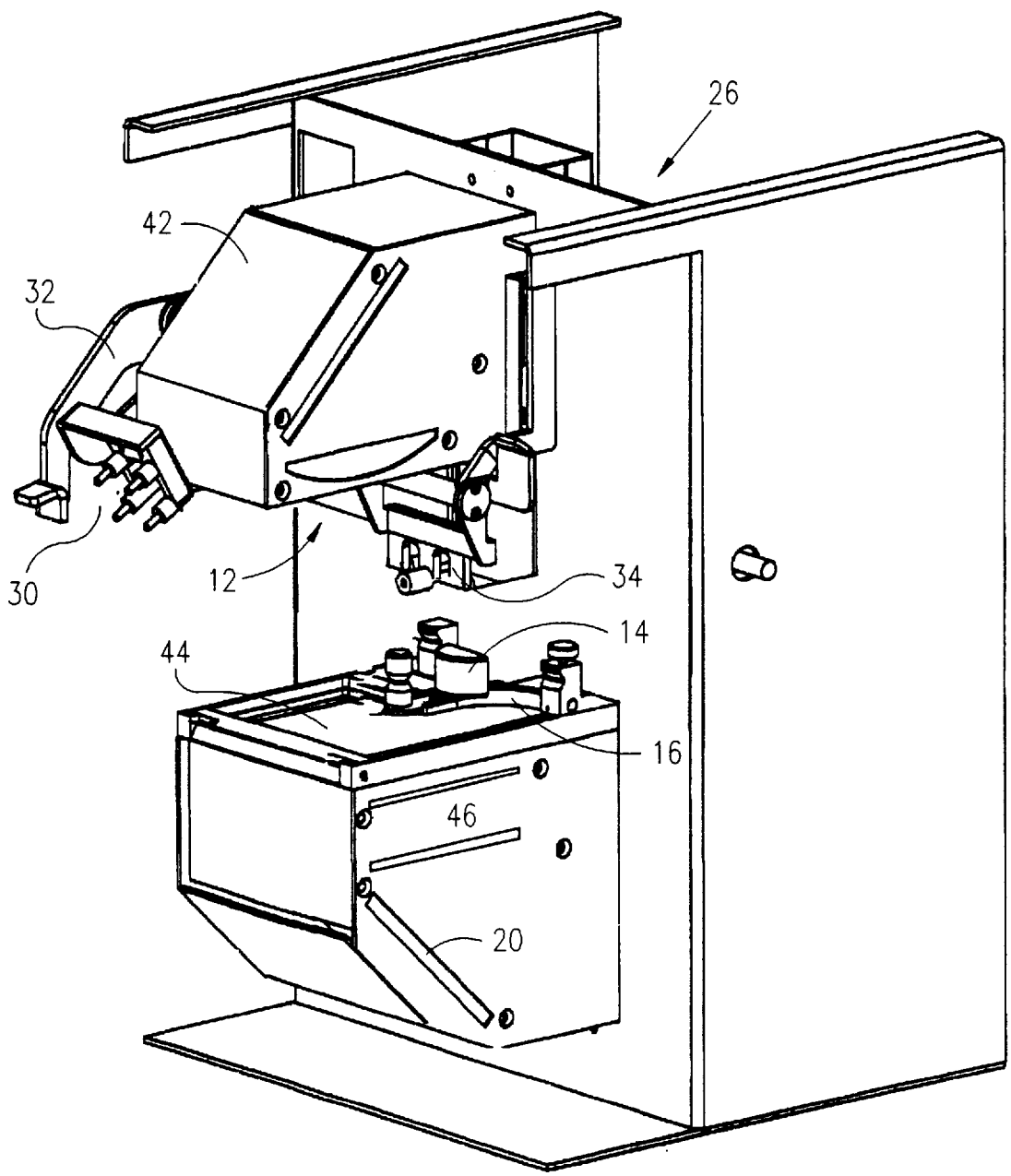
FIG. 5 shows a further embodiment of a visual spectacle mapping system, including an optical system whose aperture is sufficiently large to accommodate both lenses of a pair of spectacles, thereby obviating the need for a slide mechanism.

FIG. 5 shows a drawing of another preferred embodiment of the present invention, in which the optical apertures of all of the optical components in the system, namely the mapping beam source 42, the mapping aperture 44 and the detection optics 46, are made sufficiently large that both lenses of a pair of spectacles can be measured simultaneously. The need for motion of the spectacles between individual lens measurements is thereby eliminated. In order to obtain the same spatial resolution of the optical measurement as in the embodiment shown in FIG. 1, a CCD with higher intrinsic resolution is required. Alternatively, two CCD cameras may be placed at a fixed and known distance from one another, and may be employed to capture two respective images of at least portions of the two spectacle lenses. The two images of the lenses or of portions thereof are combined together into one image of both lenses of the spectacle. As in the previous embodiment, this large aperture system is able to provide information about incorrect lens cutting and mounting, as well as all of the other measurement and marking procedures performed with the moveable slide embodiment.

Figure 6:
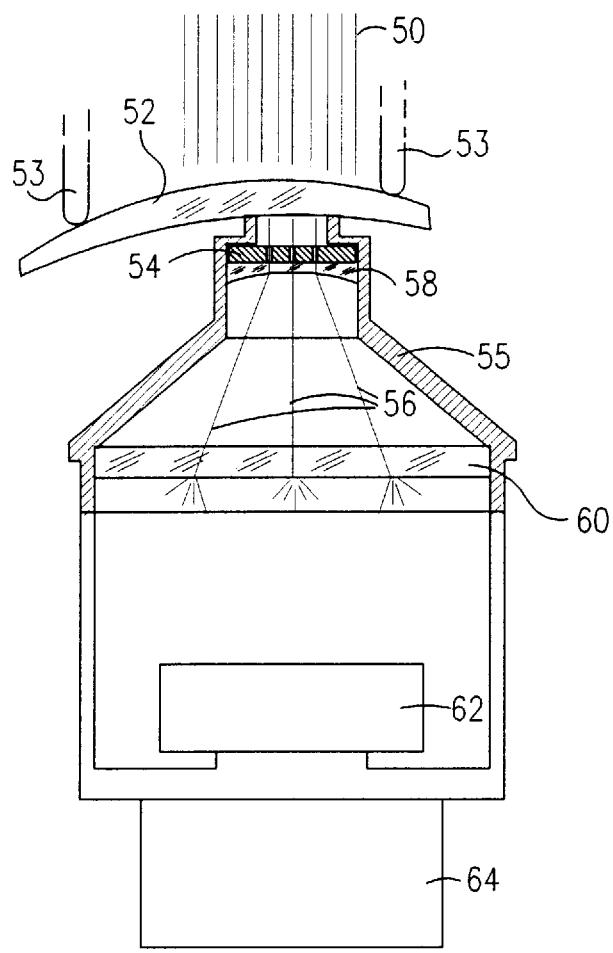
FIG. 6 is a schematic view of the optical imaging system used to measure lens power with the visual spectacle mapping system according to the present invention.

FIG. 6 is a schematic view of the optical imaging system used in a visual spectacle measuring system constructed and operative according to a preferred embodiment of the present invention. The particular measurement performed using the optical arrangement shown in FIG. 6 is a power measurement of the lens, by a modified Hartmann technique. The collimated light 50 is produced typically by means of a positive condensing lens positioned at its focal length distant from the light source. Such arrangements are well known in the art and will not be further described herein.

Figure 7A:
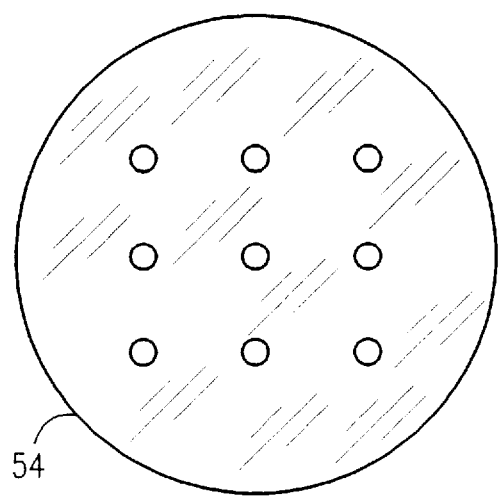
FIG. 7A to 7C show various matrix plates for use in the system.

The lens under test 52 is positioned in the collimated beam on top of the power meter dome 55 and is held in position by the pins 53 of the blocker mechanism 30, shown in FIG. 1. Inside the dome, and immediately beneath the lens under test is positioned a matrix plate (Hartmann plate) 54, consisting of a small metal plate with an array of holes. The matrix plate can also be preferentially constructed of a glass screen, with a thin opaque film coating, and the hole pattern defined thereon photolithographically. Such a matrix plate is more accurate in defining optical parameters than a metal one This matrix divides the beam up into a number of discrete fine beams 56. For the lens power measurement, in order to enable fuller characterization of non-spherical lenses also, the matrix should have more than the 4 holes described in the Malacara prior art. A plate with 9 holes, arranged in a 3×3 array may be preferably used. Such a matrix plate is shown in FIG. 7A, has an outside diameter of 12.6 mm. and holes of diameter 0.8 mm located at a 1.75 mm pitch between centers. The use of more than 4 beams in this embodiment of the present invention, is a significant improvement over the previous 4-beam prior art lens meter technology, as it allows the local wavefront after passing through the lens to be fitted to a higher order polynomial, thereby increasing the number of parameters which may be measured. Using 9 beams, Zernicke polynomials of degree up to n=18, may for instance, be used to provide greater accuracy in the power measurement, thereby enabling full characterization of non-spherical lenses also.

Immediately beneath the matrix screen is located a negative lens 58, such as a 12.7 mm diameter PCV lens with f=−50 mm, as supplied by Edmund Scientific of Barrington N.J. under Model No. ES-A8025. This lens diverges the measurement beams 56, and thereby keeps them sufficiently separated that they can all be measured simultaneously. This enables the measurement to be performed more simply and speedily than the prior art method described by the Malacara's, where the individual beam measurements must be performed sequentially.

The beams hit a diffusive screen 60 located a distance large enough from the negative lens to ensure that they are sufficiently diverged to be distinctly separated. The illuminated impact pattern on the diffusive screen 60 is imaged by means of imaging optics 62, in the form of an 8.5 mm, f 1.3 lens video lens located in front of the CCD camera 64, as previously described. The information from the CCD camera is inputted into the electronic processing and control unit 26 as shown inside the housing in FIG. 1, and outputted to the system display monitor 28 shown in FIG. 1.

However, the use of a negative lens 58, introduces spherical aberrations on the same scale as those present in typical ophthalmic lens designs, and this would make the power measurements very inaccurate. The present invention incorporates a method for eliminating the effects of these aberrations, by performing reverse ray tracing through the system with and without the lens under test. In this computational procedure, a reverse ray is plotted from the Hartmann spot on the imaging screen back to the equivalent hole in the Hartmann plate (the matrix plate) without the presence of the negative lens. The negative lens is then inserted into the computation, and the position of impact of the reverse ray on the Hartmann plate is calculated, using the known characteristics of the negative lens. The point of passage of the real ray through the Hartmann plate is moved iteratively towards the point of impact of the reverse traced ray until the two coincide. This procedure is repeated without the lens under test to obtain a reference for the calculation. In this way, complete compensation can be made for the effects of the aberrations of the negative lens.

Figure 8A:
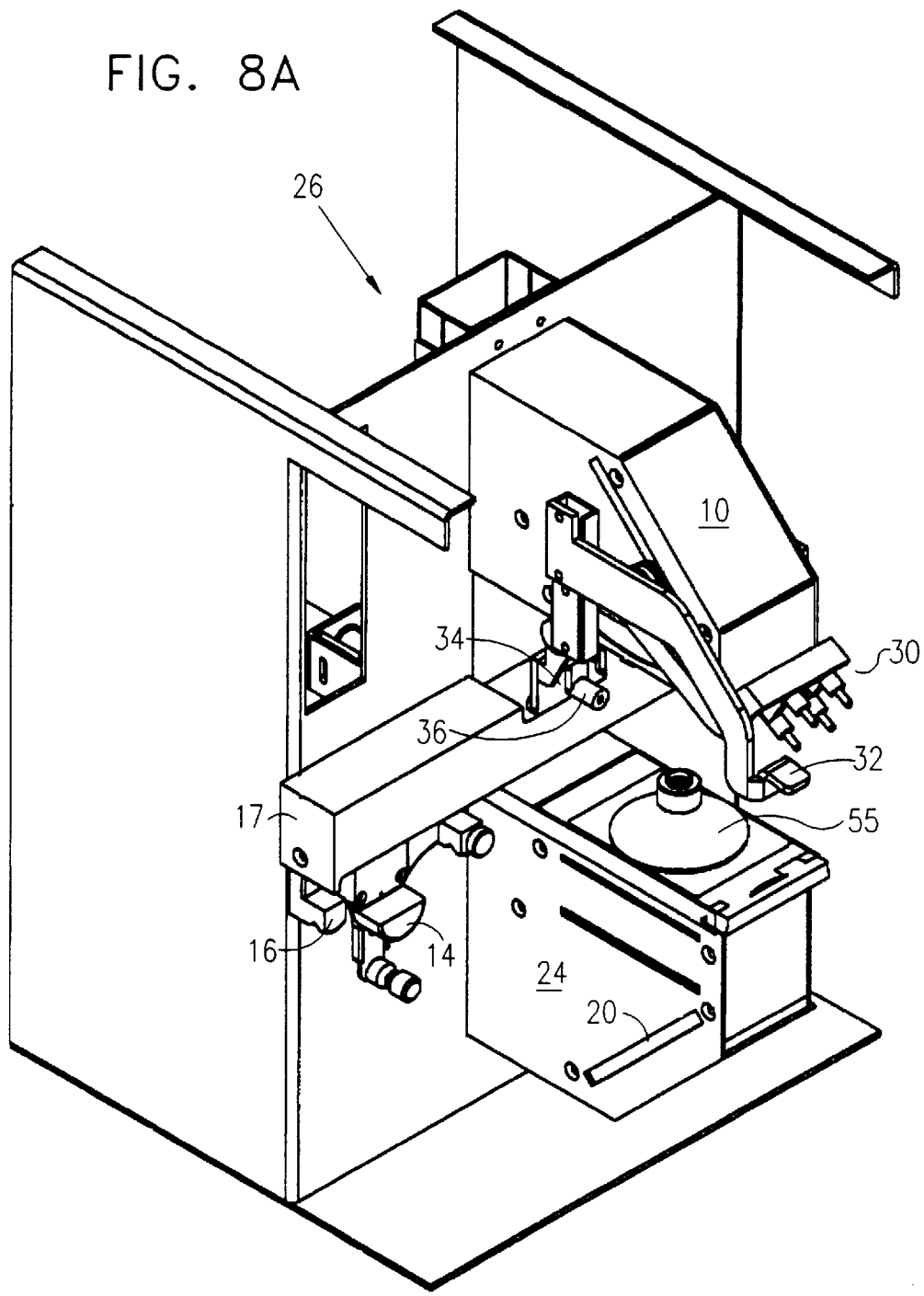
FIG. 8A is an isometric view of the visual spectacle mapping system configured in the lensmeter mode of operation, with the lens power measurement dome in place, while in FIG. 8B, the lens blocker has been lowered to hold the lens during measurement.

An isometric view of the visual spectacle mapping system of the present invention, configured in the lensmeter embodiment, is shown in FIG. 8A, with the lens power measurement dome 55 in place over the mapper aperture. The spectacle clamping slide 16 is in its folded down position, so as not to interfere with the power measurement. In FIG. 8B, the same system is shown with the lens blocker 30 moved into place by means of the lever 32, so as to hold the lens under test in the correct position.

In FIG. 9 is shown a scale layout drawing of the optical system used in the power measurement embodiment shown in FIG. 6. Shown in this drawing are the optical source 70, the source beam bending mirror 72, the source collimating lens 74, the source aperture 12, the power measurement dome 76, the Hartmann plate (matrix plate) 54, the negative lens 58, the background light filter 62, the diffusing plate 60 for producing a visual pattern of the Hartmann spots, the image beam bending mirror 78, the image focusing optics 62, and the CCD camera 64. A tray slot 61 for a large matrix plate is also shown, but is not used when the system is used in the lensmeter mode.

Figure 7B:
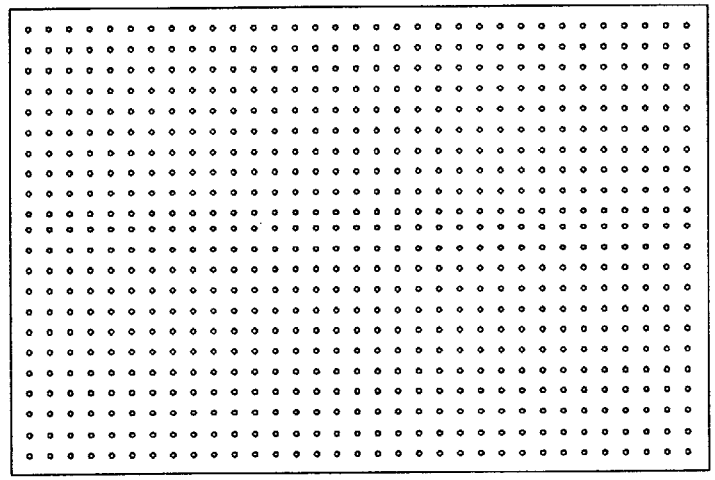

This embodiment of the present invention can also be used for lens mapping measurements, by simply removing the power measurement dome 76 containing the matrix plate 54 and negative lens 58, and in their place, inserting into the tray slot 61, a mapping matrix plate with a large number of holes. A typically used matrix plate, of dimensions 49×62 mm, is shown in FIG. 7B, and has an array of 23×31 rows of holes on a 1.9 mm pitch, and of diameters of from 0.08 to 0.13 mm, depending on their location in the plate. Switching of the system between the two modes of operation is therefore particularly simple. No other optical adjustments are necessary, neither to the source configuration, nor to the imaging system.

This commonality of source and imaging subsystems is achieved by correct selection of the negative lens power, such that the focusing distances to the imaging lenses need not be changed. The use of a negative lens is equivalent to a reduction in the optical distance between the matrix plate and the diffusive imaging screen. In the mapper mode, the mechanical distance is about 30 mm, while in the lensmeter mode, the dome increases it to about 60 mm. The negative lens used in the lensmeter mode thus reduces the optical distance to make it equal to the 30 mm of the mapper mode. This embodiment of the present invention is therefore a lensmeter and a lens mapper combined into one instrument.

This embodiment is therefore a significant improvement over prior art instruments, which do not allow the performance of local measurements, i.e. a lensmeter mode, together with a mapping capability, using the same optics.

The lens mapper embodiment is capable of measuring all of the commonly used optical characteristics of both ophthalmic lenses of a pair of spectacles, sphere, cylinder, axis, prism and coma aberration. These measurements are performed not only on each lens individually, but also relative to each other and to the spectacle frames, in a single reference clamping position of the frames. The lenses may be of any type, spherical, toric or progressive. The use of the present invention in mapping the lenses of complete pairs of spectacles can be best described by reviewing the display screens generated by the system's program software. These screens are shown in FIGS. 11 to 19 below.

Figure 7C:
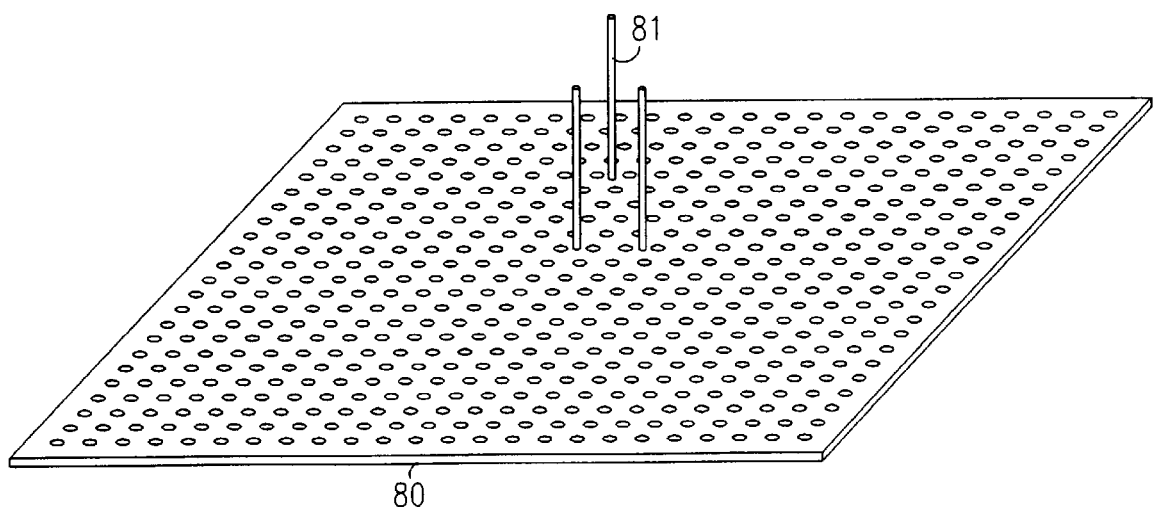

A further preferred embodiment of the present invention is obtained by replacement of the complete lensmeter dome assembly 55 shown in FIG. 6, by a modified mapping matrix plate, such as that shown in FIG. 7C. The plate 80 has three thin equally spaced rods 81 projecting from its central area, and enclosing a number of holes. These rods support the lens for the power measurement as per the requirements of the ISO standard, No. ISO/D158598, with the back surface of the lens perpendicular to the axis of the incident measuring beam. This matrix plate thus enables a new application of the present invention, wherein it becomes possible to merge the lensmeter and mapping modes so as to obtain simultaneous display of a power measurement accurately performed at a local point defined within the rod's area, together with the mapping display of the whole lens.

When the mapper mode is used to obtain a whole lens view of an optical parameter, such as the power, the lens is laid in a flat position on the matrix plate. Because of the sagitta of the lens, it is impossible to perform the measurement at each point of the lens under identical conditions, such as the conditions used for making a lensmeter measurement, i.e. with the lens at a defined position from the focusing lens, and perpendicular to the incident beam axis. This preferred embodiment of the current invention enables local measurement to be made in the mapper mode at any point on the surface of the lens at a fixed reference height above the matrix plate, and without any effect of lens tilt, thereby eliminating the inaccuracies in the measurement due to the lens sagitta.

In prior art instruments, the user positions the lens under test on the lensmeter, using visual feedback obtained from the position of a cross generated on the screen. The cross position is defined by the local prism value. This method of positioning is sufficient for single vision correction lenses, but cannot be used for progressive lenses. Several methods of overcoming this limitation have been proposed, using the local prism orientation, instead of the prism value, but they are complicated to use and need a high level of operator skill.

This new embodiment of the present invention allows a new mode for measurement of ophthalmic lenses. It allows the operator to position the lens while viewing the optical map of the lens. This optical map can be of sphere, cylinder or prism values of the lens, depending on which property is being used for alignment. Motion of the lens generates a new map on the display in real time. By following the continuous changes in the map display as he moves the lens, the user is able to position the lens very easily to a high level of precision, allowing accurate integration of lenses into their frames. Furthermore, the lenses can be marked to high precision, based on the optical map shown.

FIGS. 10A to 10F illustrate how this mode of operation is used in aligning a progressive lens. FIGS. 10A to 10C show how the user manually positions the lens 82 on the 3-rod structure 83 at the center of the mapping matrix plate 84, so that the far, intermediate and near vision areas of the lens are respectively centered on the three-rod structure. The corresponding optical map displays on the instrument screen 85 are shown in FIGS. 10D to 10F, which show real power maps of a progressive lens 86 being aligned. The position of the three-rod structure is simulated on the screen by means of a fiducial mark, such as a circle 88, which is maintained in the center of the screen. As the lens is moved manually, or rotated, its map image moves on the screen, tracking the motion of the lens itself. Using this mode of operation, the function of accurate lens alignment thus becomes a simple and speedy procedure. In effect, the synthetic cross of the prior art instrumentation, representing only the prism value, is replaced by an optical map, which can provide the user with far more information for alignment purposes. Though FIGS. 10D to 10F illustrate the use of this technique on a progressive lens, it can be applied to any type of lens, whether an existent or a future design.

Reference is now made to FIGS. 11–19 which are illustrations of screen displays generated by the system of FIGS. 1–10.

FIG. 11 is an initial screen display generated by the system which allows a user to request operation of the mapping functionality of the system of the present invention (FIGS. 12–18) or of the lensmeter functionality of the system of the present invention (FIG. 19).

FIG. 12 is an initial mapping screen display generated by the system if the "mapper open" button of FIG. 11 is selected. As shown, the screen display of FIG. 12 includes control buttons which, inter alia, allow a user to indicate (button 100) whether he wishes to map both lenses of a pair of spectacles or a single uncut lens. The control buttons also typically allow a user to indicate the type of lenses which are under test (buttons 110, 120 and 130). These buttons are provided if the system provides different information for each of various types of lenses, as in the illustrated embodiment, as is apparent by comparing FIGS. 13A–13B (spheric) to FIGS. 14A–14B (toric) to FIGS. 15–18 (progressive).

FIG. 13A is a screen display generated if the user indicates, using button 110 of the screen display shown in FIG. 12, that the LEUT or LEUTs are spheric, and further indicates, using button 100, that both lenses in a pair of spectacles are to be tested. As shown, the lens power (also termed herein "SPH" or "sphere") is indicated, as well as a prism value and the interpupil distance from the optical center of the LEUT to the center of symmetry of the frames.

As described above, the system is preferably configured to receive spectacles in two possible orientations: a left orientation in which the LEUT is the left lens of the spectacles, and a right orientation in which the LEUT is the right lens of the spectacles. The system is preferably operative to detect, independently, whether spectacles which have been mounted in the system are in the left orientation or in the right orientation. The screen display of FIG. 13A is generated for spectacles which are found to be in the left orientation.

Figure 13B:
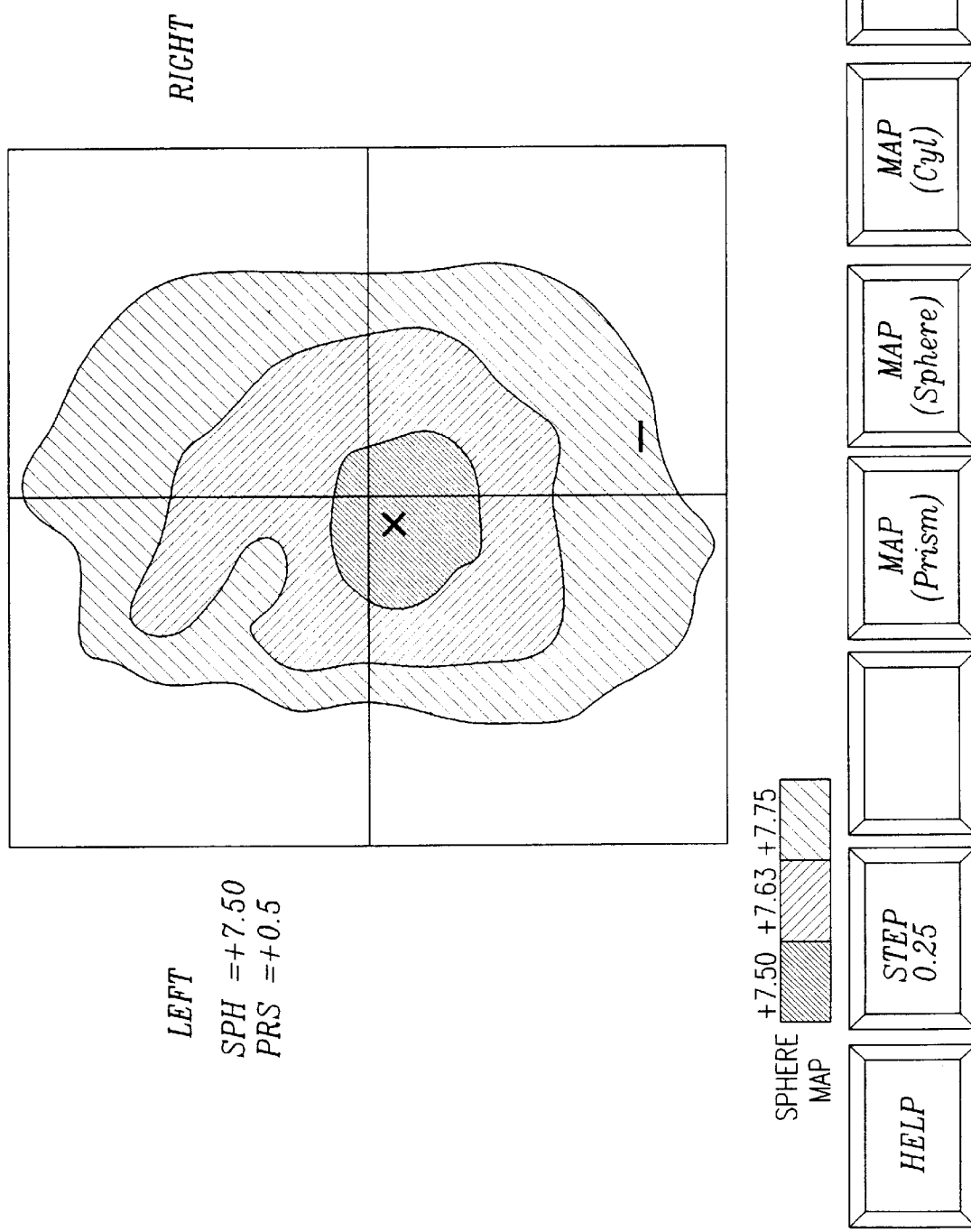
FIG. 13B is a screen display generated if the user indicates, using button 110, that the LEUT or LEUTs are spheric, and further indicates, using button 100, that the LEUT is a single uncut lens rather than a pair of spectacle lenses.

FIG. 13B is a screen display generated if the user indicates, using button 110, that the LEUT or LEUTs are spheric, and further indicates, using button 100, that the LEUT is a single uncut lens rather than a pair of spectacle lenses.

FIG. 14A is a screen display generated if the user indicates, using button 120, that the LEUT or LEUTs are toric, and further indicates, using button 100, that there are two LEUTs, i.e. both lenses in a pair of spectacles, and further places the spectacles in the system in a left orientation.

As shown, the screen display of FIG. 14A typically includes an indication of the location of the LEUT's axis relative to the spectacle configuration. In the illustrated embodiment, the axis location is indicated by an arrow 140.

FIG. 14B is a screen display generated if the user indicates, using button 120, that the LEUT or LEUTs are toric, and further indicates, using button 100, that the LEUT is a single uncut lens rather than a pair of lenses mounted in spectacles.

FIGS. 15–17 are screen displays generated if the user indicates, using button 130, that the LEUT or LEUTs are progressive, and further indicates, using button 100, that the LEUTs include both lenses in a pair of spectacles.

Using the screen display of FIG. 15, the user typically selects one of several types of maps, such as cylindrical, spherical, prism (control buttons 150, 160, 170, respectively).

FIG. 16 is a screen display generated if the user selects the "cylindrical" option using control button 150 of FIG. 15, and further indicates, using control button 100 of FIG. 12 that a single uncut lens is being tested. As shown, both far vision and near vision information is provided including:

SPH FV (spherical far vision power)
CYL FV (cylindrical far vision power)
ADD=SPH FV, SPH NV, (where SPH NV is spherical near vision power)
PDX NV, PDY NV, PDX FV, PDY FV (x and y components of interpupil distance for near vision and far vision, respectively).

Locations L1 and L2 indicate the far vision and near vision points, respectively. Arrow A1 indicates the distance between L1 and the axis of symmetry of the spectacle frames, which is exactly PDX NV. Arrow A2 indicates the distance between L2 and the axis of symmetry of the spectacle frames, which is exactly PDX FV.

In the illustrated embodiment, all spectacle lenses are mapped, scaled appropriately, within a display image of a frame of fixed size and shape. For example, an oval-shaped LEUT may be mapped within a display image of a circular frame by mapping a circular portion of the LEUT which is circumscribed within the generally oval configuration of that LEUT. The portions of the LEUT which do not fall within the circle are typically not functionally significant. More generally, a circular portion of the LEUT is mapped which includes all active, significant locations within the LEUT.

Alternatively, the display image of the frame may be of various sizes, depending on the size of the LEUTs.

It is appreciated that the display screens of FIGS. 13A, 14A and 16 display information pertaining to the first spectacle LEUT being mapped. By moving the spectacles from the left orientation to the right orientation, information pertaining to the second spectacle LEUT can be mapped, and a screen displayed showing the ophthalmic information of interest for both lenses, e.g., in the illustrated case, also for the right lens. FIG. 17 is such a display screen showing information regarding both lenses rather than only about the left lens as in FIG. 16.

Figure 18:
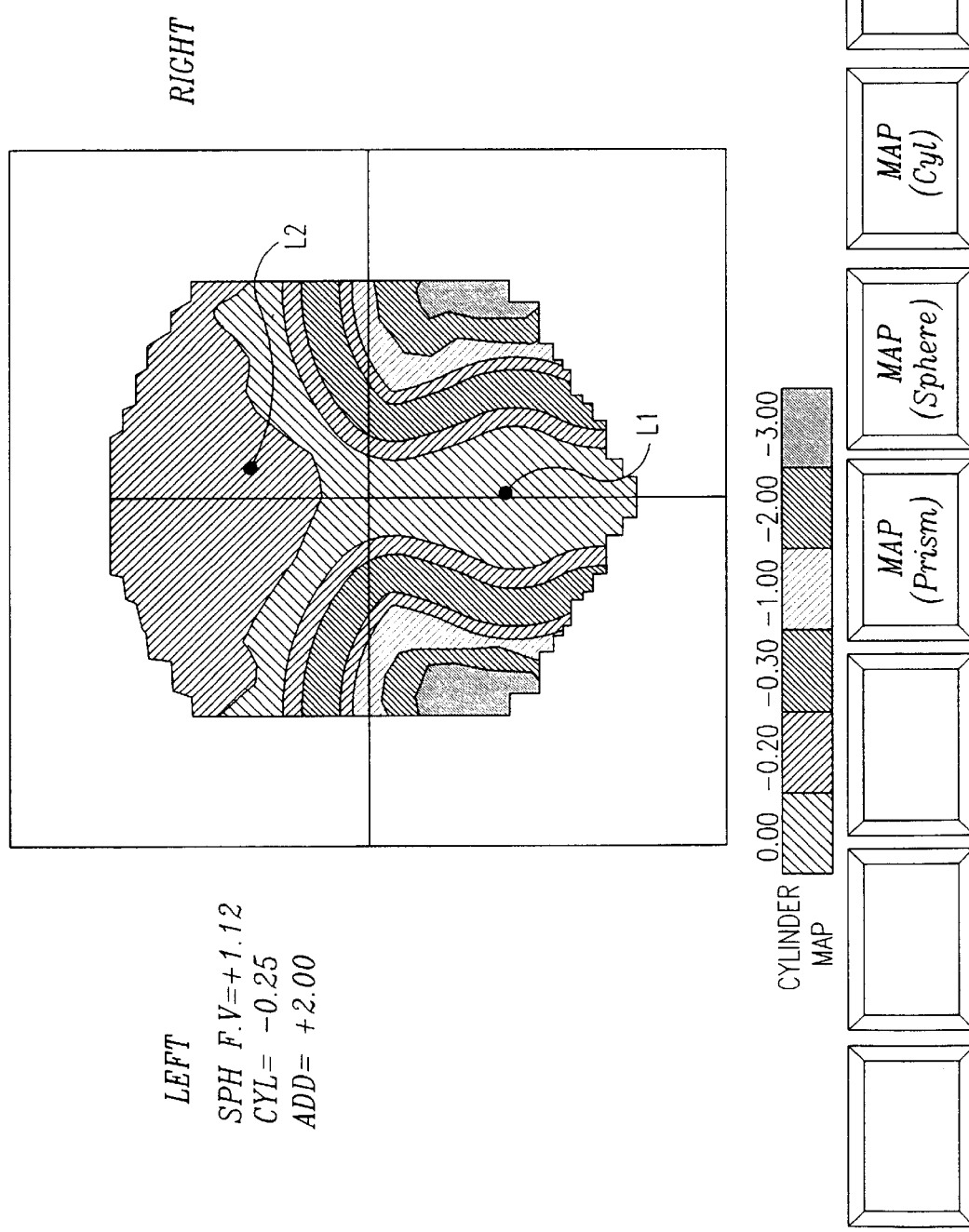
FIG. 18 is a screen display generated if the user indicates, using button 130, that the LEUT or LEUTs are progressive, and further indicates, using button 100, that the LEUT is a single uncut lens rather than a pair of spectacle lenses.

FIG. 18 is a screen display generated if the user indicates, using button 130, that the LEUT or LEUTs are progressive, and further indicates, using button 100, that the LEUT is a single uncut lens rather than a pair of spectacle lenses.

FIG. 19 is an initial screen display generated by the system if the user requests operation of the lensmeter functionality of the system of the present invention, for a single LEUT, using the "lensmeter" control button in FIG. 11.

Figure 20:
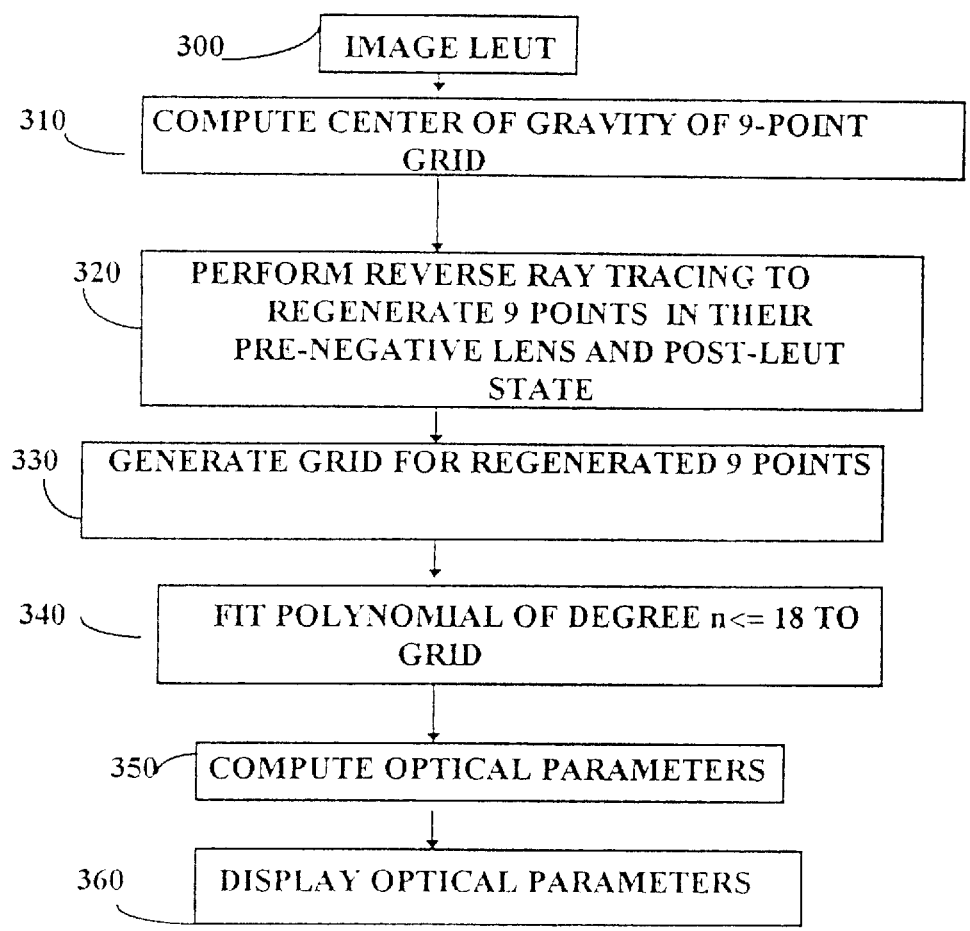
FIG. 20 is a simplified flowchart illustration of a preferred method for operation of the system of the present invention, in lensmeter mode.

Reference is now made to FIG. 20 which is a simplified flowchart illustration of a preferred method for operation of the system of the present invention, in lensmeter mode. In lensmeter mode, a LEUT is examined in order to determine its local optical characteristics, such as power (sphere) and local aberrations such as cylinder, axis, prism, coma. According to a preferred embodiment of the present invention, as described above, local characteristics of an individual location are determined by more than four samplings of the immediate vicinity of the individual location. In the present specification, 9 samplings are referred to which is only one example of a suitable number of samplings.

In step 300, the LEUT is imaged. This step is typically performed in real time, periodically, e.g. each 20–40 millisecs, in order to enable a user to manually move the LEUT and to obtain immediate feedback. This allows the user to manually locate crucial locations in the LEUT, by trial and error guided by studying the real time images provided by the system as the LEUT is moved. For example, in a spheric lens, the LEUT location having minimal prism value can be located. In a multifocal lens, near and far vision points can be located. In a toric lens, the axis maybe located by rotating the lens.

The 9-point grids created in step 310 and in step 330 (once from the 9 Hartmann points or holes as imaged and once from the 9 Hartmann points or holes as regenerated) are each computed using any suitable method such as the method described in Applicant's copending published PCT Application, pages 22–24, in which the LEUT is termed "test optical element" and the 9 Hartmann points are termed "test spots".

A preferred method for performing step 320 is described in detail below with reference to FIG. 27. The output of step 320 is a regeneration of the 9 Hartmann points used to sample a vicinity of a particular lens location, as they would have been imaged after passing through the LEUT but before passing through the negative lens.

The polynomial of step 340 represents the wavefront of the light after it impinges on the LEUT. The 9 (by way of example) Hartmann points can be considered as 9 samples of this wavefront. If 9 Hartmann points are employed as in the present example, the polynomial's degree does not exceed 18 because the 9 Hartmann points, each having 2 coordinates (x and y) generate only 9×2=18 degrees of freedom.

A suitable 4-degree polynomial is described in the above-reference Malacara publication.

Using a higher degree polynomial to estimate the wavefront sampled by the Hartmann points is advantageous because this allows higher degree aberrations to be identified and defined as described in pages 88–92 of the following publication:

J. C. Wyant and K. Creath, "Basic wavefront aberration theory for optical metrology", pp. 2–53, in *Applied optics and optical engineering*, Vol. XI, R. R. Shannon and J. C. Wyant, Eds. (Academic Press, Boston, 1992). A method for best-fitting a high-degree polynomial, such as an 18-degree polynomial, to Hartmann points is described in Applicant's copending PCT Application, pages 23–28.

If only 4 Hartmann points are used, the significance of the coefficients of the polynomial are as described on page 24 of Applicant's copending published PCT application and in Malacara. If more than 4 Hartmann points are used, such as 9 Hartmann points, the significance of each of the higher coefficients is described in Wyant and Creath, page 88.

Figure 21:
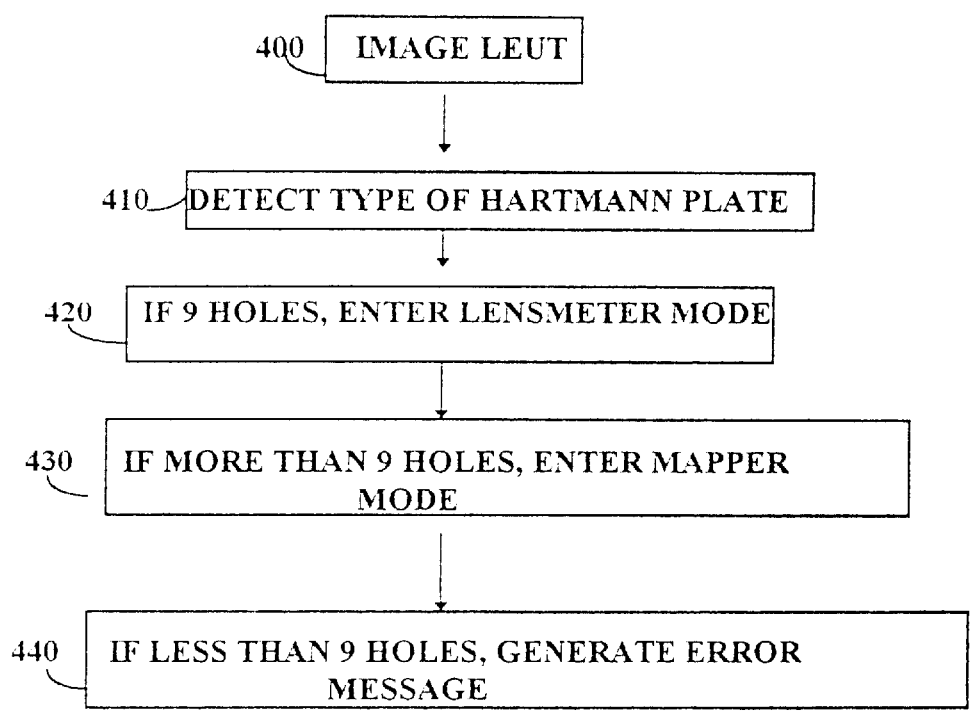
FIG. 21 is a simplified flowchart illustration of a preferred method for automatically determining whether to operate in lensmeter mode or in mapper mode, for embodiments in which the mode of operation is system-determined rather than user-selected.

Reference is now made to FIG. 21 which is a simplified flowchart illustration of a preferred method for automatically determining whether to operate in lensmeter mode or in mapper mode, for embodiments in which the mode of operation is system-determined rather than user-selected.

In step 400, the LEUT is imaged, either with or without negative lens 58.

In step 410, the type of Hartmann plate currently mounted in the system is determined. As illustrated in FIGS. 7A–7C, there are two possible types of plate which may be mounted in the system: the lensmeter plate, in which the Hartmann plate has 9 holes, as shown in FIG. 7A, or a mapper plate, in which the Hartmann plate has a larger number of holes as shown for example in either of FIGS. 7B or 7C. Typically, in the illustrated embodiment, and assuming that the mapping function is in accordance with the mapping methods described in Applicant's above-referenced copending Published PCT Application, the system needs only to determine whether the Hartmann plate has 9 holes or has many more than 9 holes. This is effected by detecting and counting bright "local maximum intensity" locations in the LEUT image, whose intensity falls above a certain threshold. The threshold may, for example, be approximately 10% of the average light intensity in the image.

Figure 22:
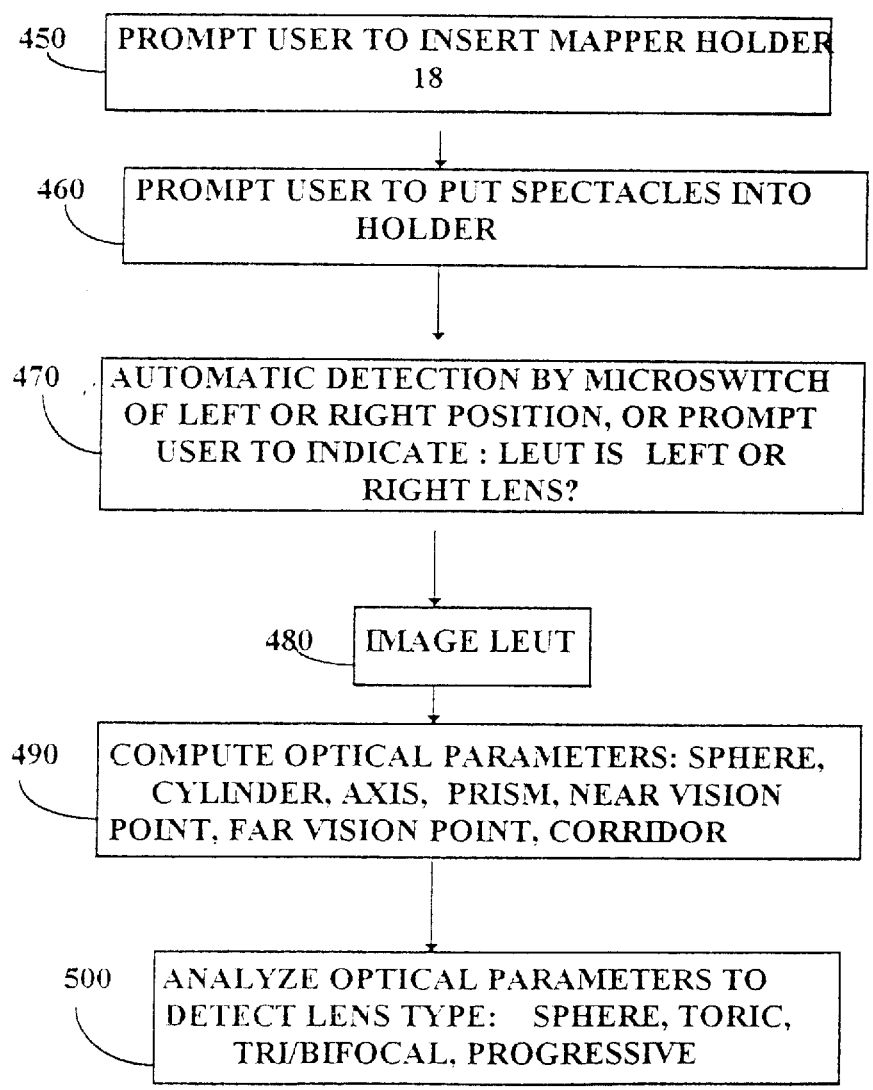
FIG. 22 is a simplified flowchart illustration of a preferred method for operation of the system of the present invention, in mapper mode, automatic lens type detection submode, where the LEUTs comprise a pair of lenses mounted in spectacles.

Reference is now made to FIG. 22 which is a simplified flowchart illustration of a preferred method for operation of the system of the present invention, in mapper mode, automatic lens type detection submode, where the LEUTs comprise a pair of lenses mounted in spectacles.

Figure 23A:
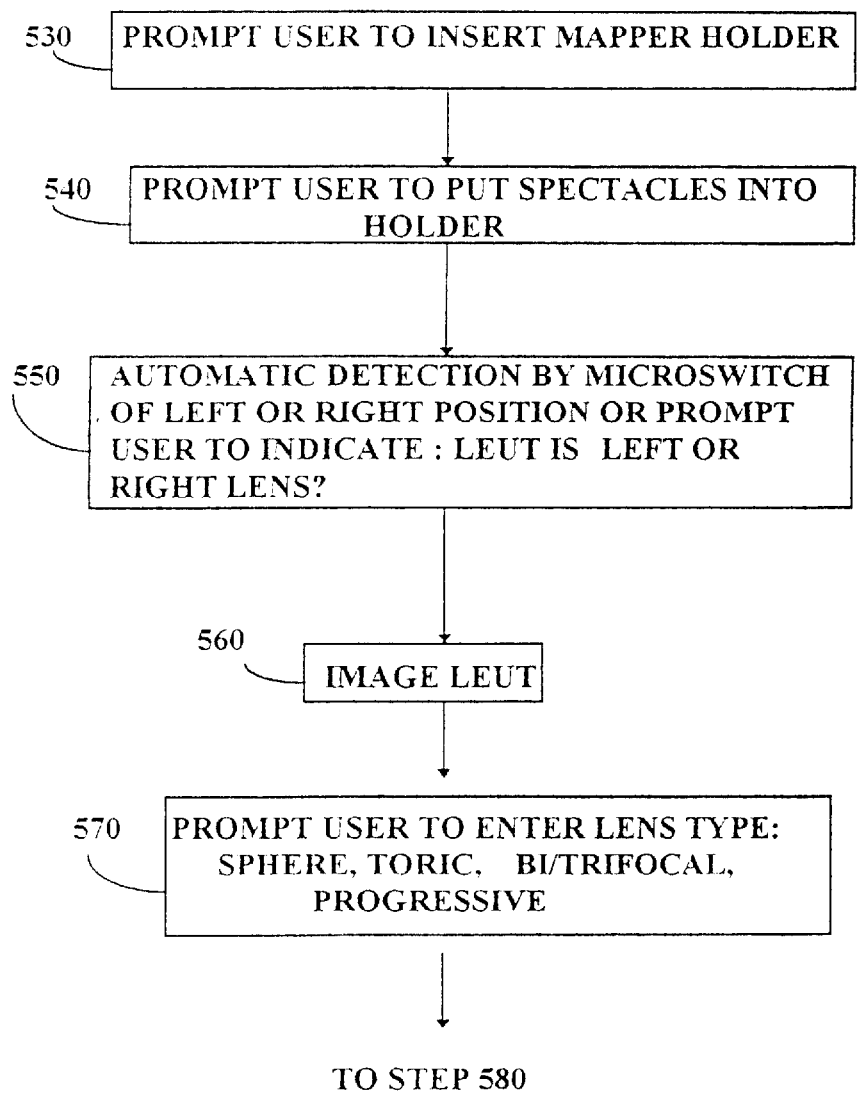

Reference is also made to FIGS. 23A–23B which, taken together, form a simplified flowchart illustration of a preferred method for operation of the system of the present invention, in mapper mode, manual lens type detection submode, where the LEUTs comprise a pair of lenses mounted in spectacles.

The system may be operative (step 470) to detect, automatically, whether the holder is in the left position or in the right position. Alternatively, this information may be provided manually in response to a suitable system prompt.

A preferred method for computing optical parameters for a lens (step 490) is described in pages 23–24 of Applicant's above-referenced copending PCT Application.

In the method of FIG. 22, detection of lens type is performed automatically by the system. Alternatively (FIGS. 23A–23B), this information may be provided manually, in response to a suitable system prompt. Preferably, elicitation of manually provided information occurs before step 490 since, for example, if the lens type is spheric, it is unnecessary to compute certain of the optical parameters which are computed in order to accommodate for more complex lens types such as progressive lenses.

"Right pupil distance" is the distance between the minimum prism location in the right lens and the axis of symmetry of the spectacles frame, which is in a fixed position relative to the holder because the holder typically clasps the spectacles at the center of the nosepiece. "Left pupil distance" is the corresponding parameter for the left lens. "R/L pupil distance" is a general term for either one of the above parameters.

In the illustrated embodiment, the lens are imaged one at a time (step 640). Alternatively, both lenses are imaged within a single coordinate system.

Figure 24:
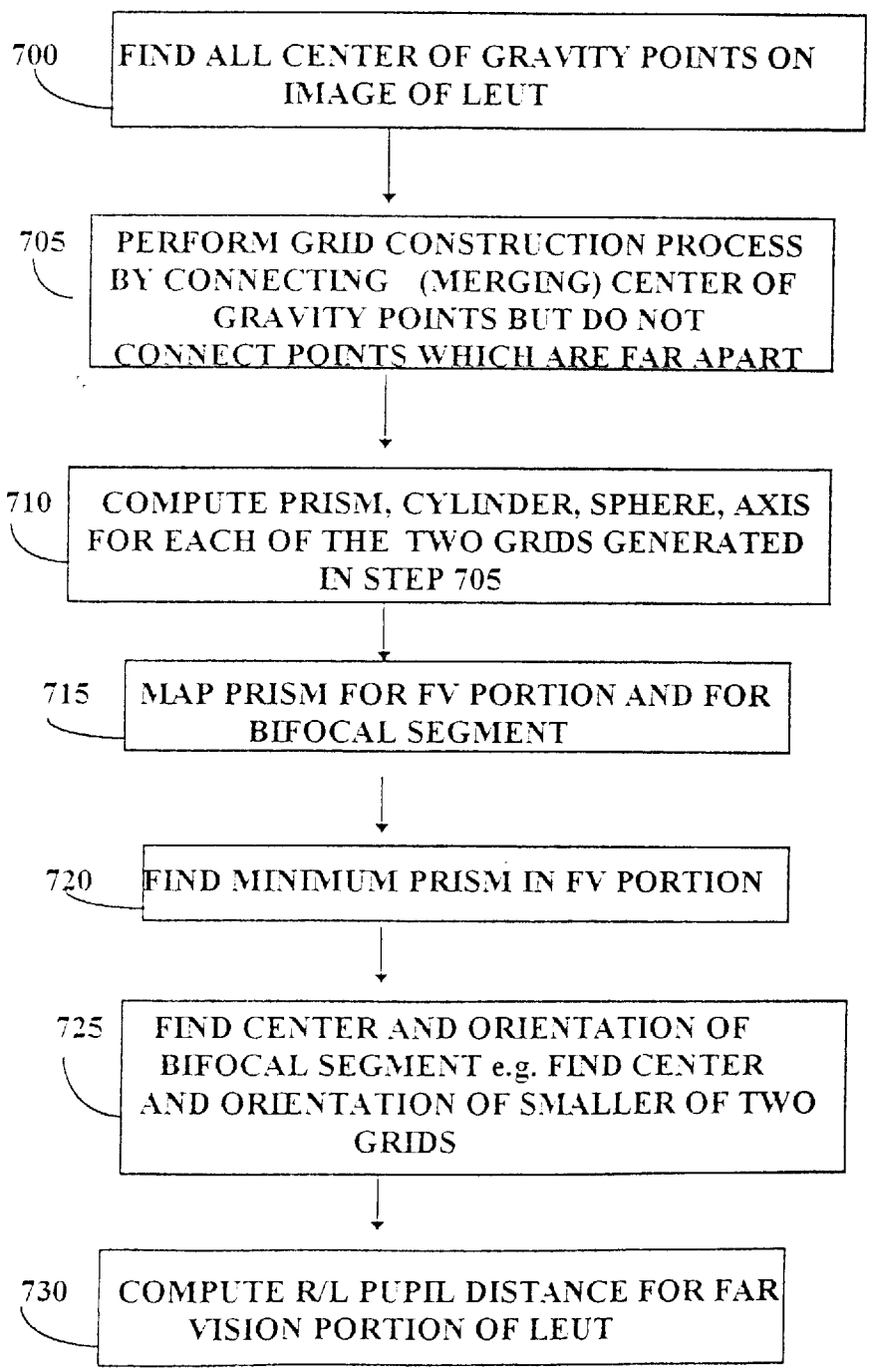
FIG. 24 is a simplified flowchart illustration of a preferred method for computing optical parameters of a LEUT mounted in spectacles, where the LEUT comprises a bifocal lens.

Reference is now made to FIG. 24 which is a simplified flowchart illustration of a preferred method for computing optical parameters of a LEUT mounted in spectacles, where the LEUT comprises a bifocal lens. Preferred methods for performing steps 705 (grid construction) and 725 (finding center and orientation of bifocal segment) are illustrated in FIGS. 9 and 10 of Applicant's above-referenced copending Published PCT Application.

First, all center of gravity (COG) points on the image of the LEUT are found. A preferred method for finding COG points is described on page 33, and in FIG. 19, of Applicants' above-referenced Published PCT Application.

In step 705, a grid construction process is performed on the center of gravity points, e.g. the grid construction process described on pages 30–31 and FIG. 19 of Applicants' above-referenced Published PCT Application. As described in the PCT Application, COG points are connected (merged) using certain criteria. However, in step 705, unlike in the disclosure of the PCT Application, COG points which are far apart are not connected. Therefore, the output of step 705 is not one grid but a pair of grids, the larger of which spans the far vision portion of the bifocals and the smaller of which spans the bifocal segment.

The criterion for "far apart" is preferably that the distance between two COG points exceeds a predetermined threshold such as 10 pixels. To determine a suitable threshold, the imaging system of the present invention may be used without a LEUT to generate a test image. In this image, the average distance between COG points is found. A suitable threshold is somewhat larger than this average distance, e.g. twice the average distance.

In step 710, optical parameters such as prism, cylinder, sphere and axis are computed for each of the two grids generated in step 705. The cylinder and axis for the far vision portions are computed only if the bifocals are toric. Preferred methods for performing these computations are described in Applicant's above-referenced copending PCT Application (Equations 1–13 and pages 24–25).

In step 715, the prism values are mapped for the far vision portion and for the bifocal segment.

In step 720, the location within the far vision (FV) portion having the minimum prism value is found.

Figure 25:
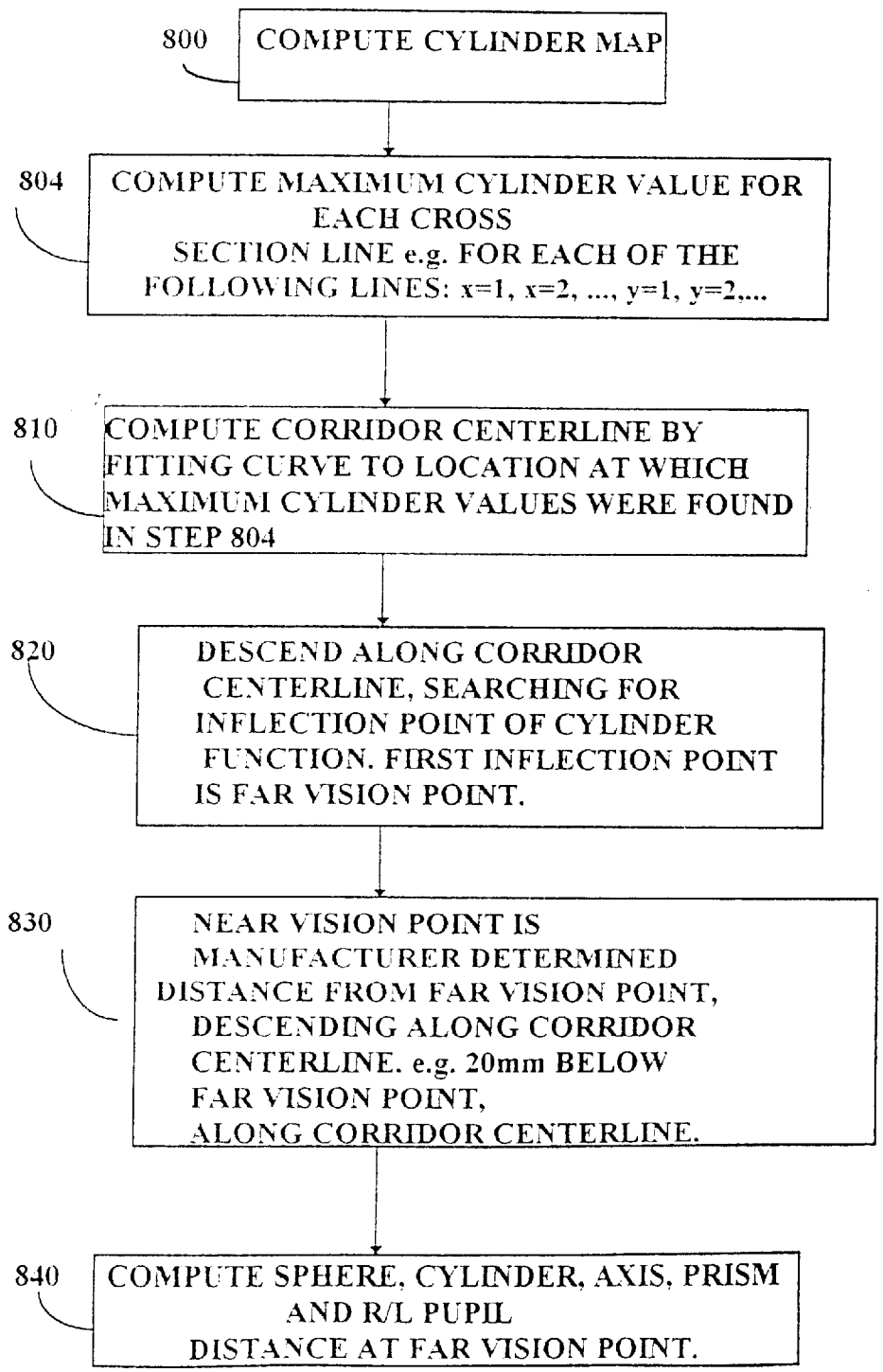
FIG. 25 is a simplified flowchart illustration of a preferred method for computing optical parameters of a LEUT mounted in spectacles, where the LEUT comprises a progressive lens.

In step 725, the center and orientation of the bifocal segment is found by finding the center and orientation of the smaller of the two grids, as shown in FIG. 25. The procedure is illustrated in FIGS. 9 and 10 of Applicant's above-referenced copending Published PCT Application.

In step 730, the right pupil distance (i.e. the distance from the right pupil to the center of the spectacle frame) or left pupil distance is computed for the far vision portion of the LEUT.

Reference is now made to FIG. 25 which is a simplified flowchart illustration of a preferred method for computing optical parameters of a LEUT mounted in spectacles, where the LEUT comprises a progressive lens. In step 810, the centerline of the corridor, which may or may not be a straight line, is computed, e.g. by fitting a curve to locations at which maximum cylinder values were found in step 804. Any suitable criterion may be used for fit, such as least squares. Any suitable family of curves may be employed such as B-spline curves.

A preferred method for performing step 800 of FIG. 25, i.e. for computing a cylinder map, is described in pages 23–24 of Applicant's above-referenced copending PCT Application.

Figure 26A:
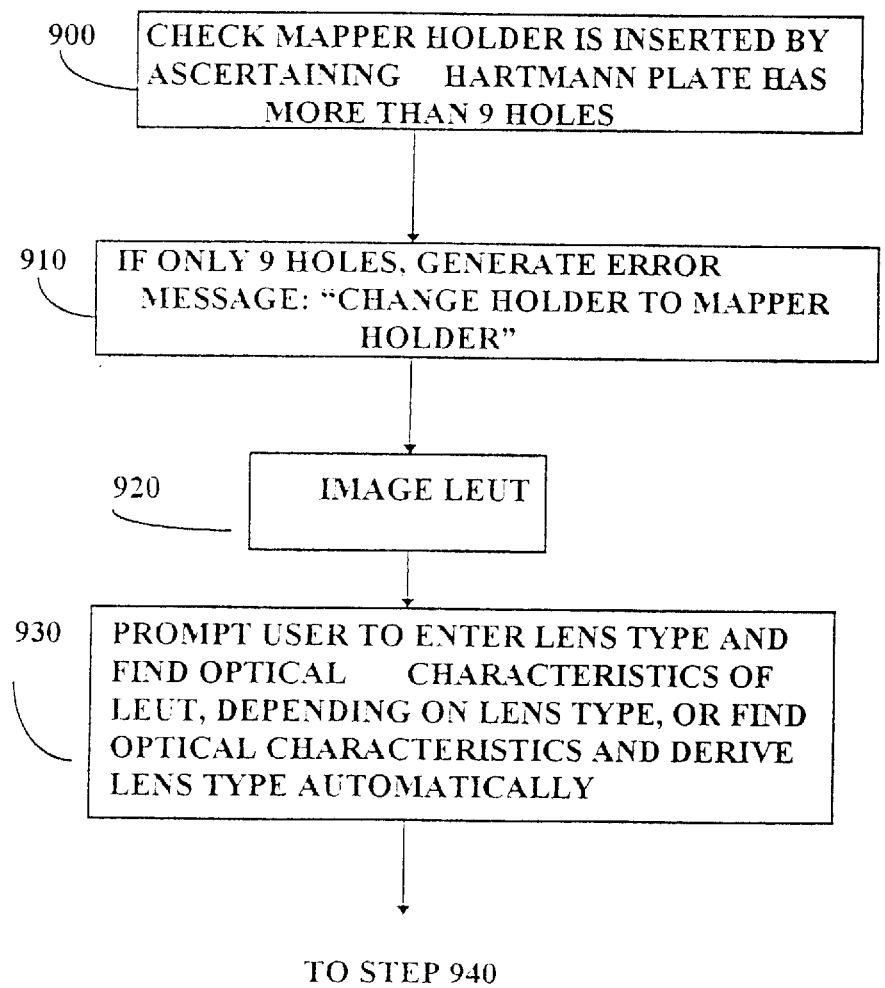
FIGS. 26A and 26B, taken together, form a simplified flowchart illustration of a preferred method for plotter operation, for an embodiment of the present invention in which the system has just mapped a LEUT, and it is desired to employ the optionally provided plotter of the system of the present invention in order to mark the LEUT.
Figure 26B:
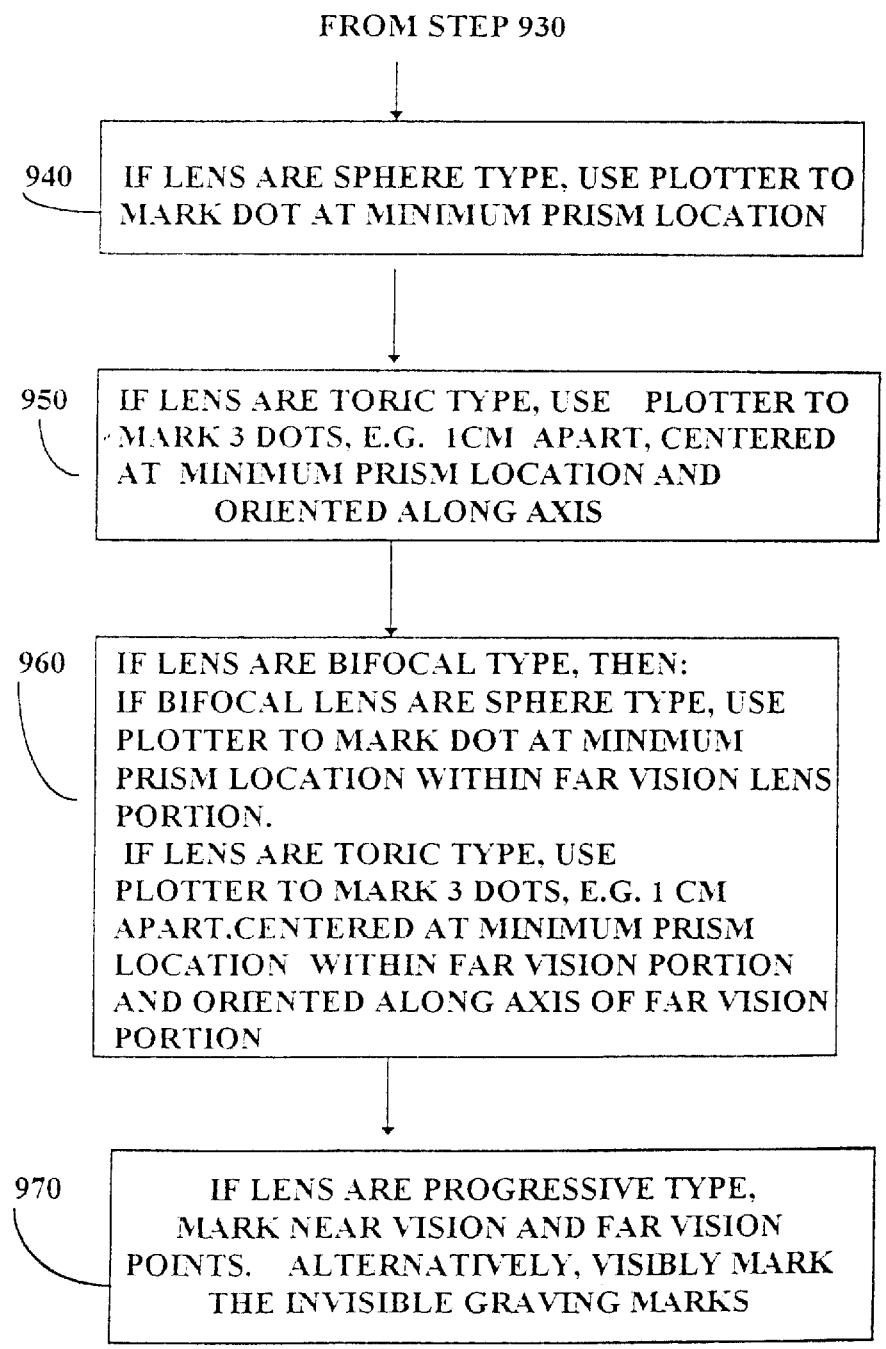

Reference is now made to FIGS. 26A and 26B, which show a simplified flowchart illustration of a preferred method for plotter operation, for an embodiment of the present invention in which the system has just mapped a LEUT, and it is desired to employ the optionally provided plotter of the system of the present invention in order to mark the LEUT.

In step 900, the system checks whether the mapper plate or the lensmeter plate is inserted.

In step 960, for bifocal toric lenses, 3 dots are typically marked to indicate the axis of the far vision portion. Although 2 dots are sufficient to indicate axis orientation, marking 3 dots makes it easy for the user to note the minimum prism location, which is simply the location of the middle one of the 3 dots.

Figure 27A:
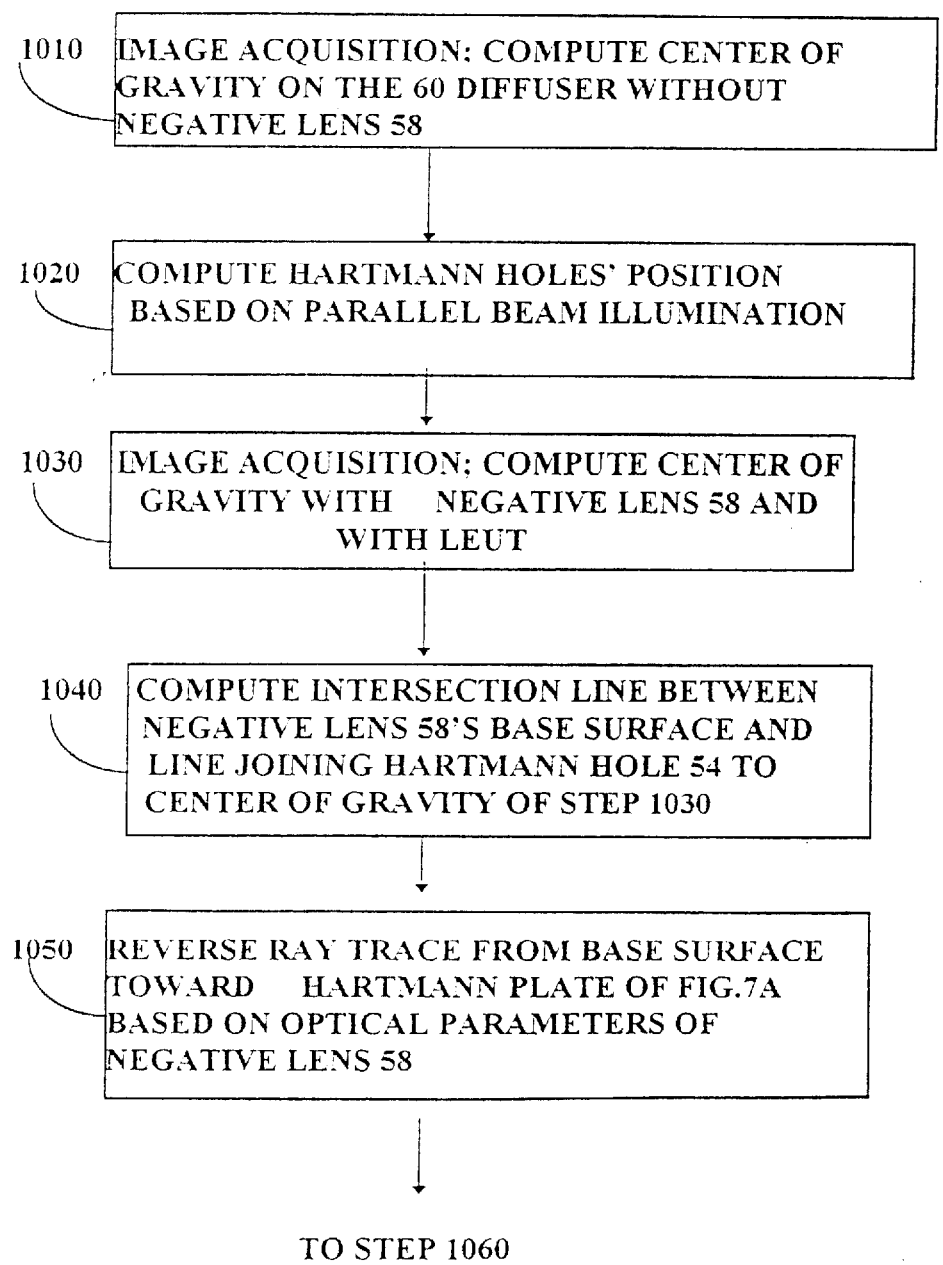
FIGS. 27A and 27B, taken together, form a simplified flowchart illustration of a preferred reverse ray tracing method suitable for performing step 320 of FIG. 20.
Figure 27B:
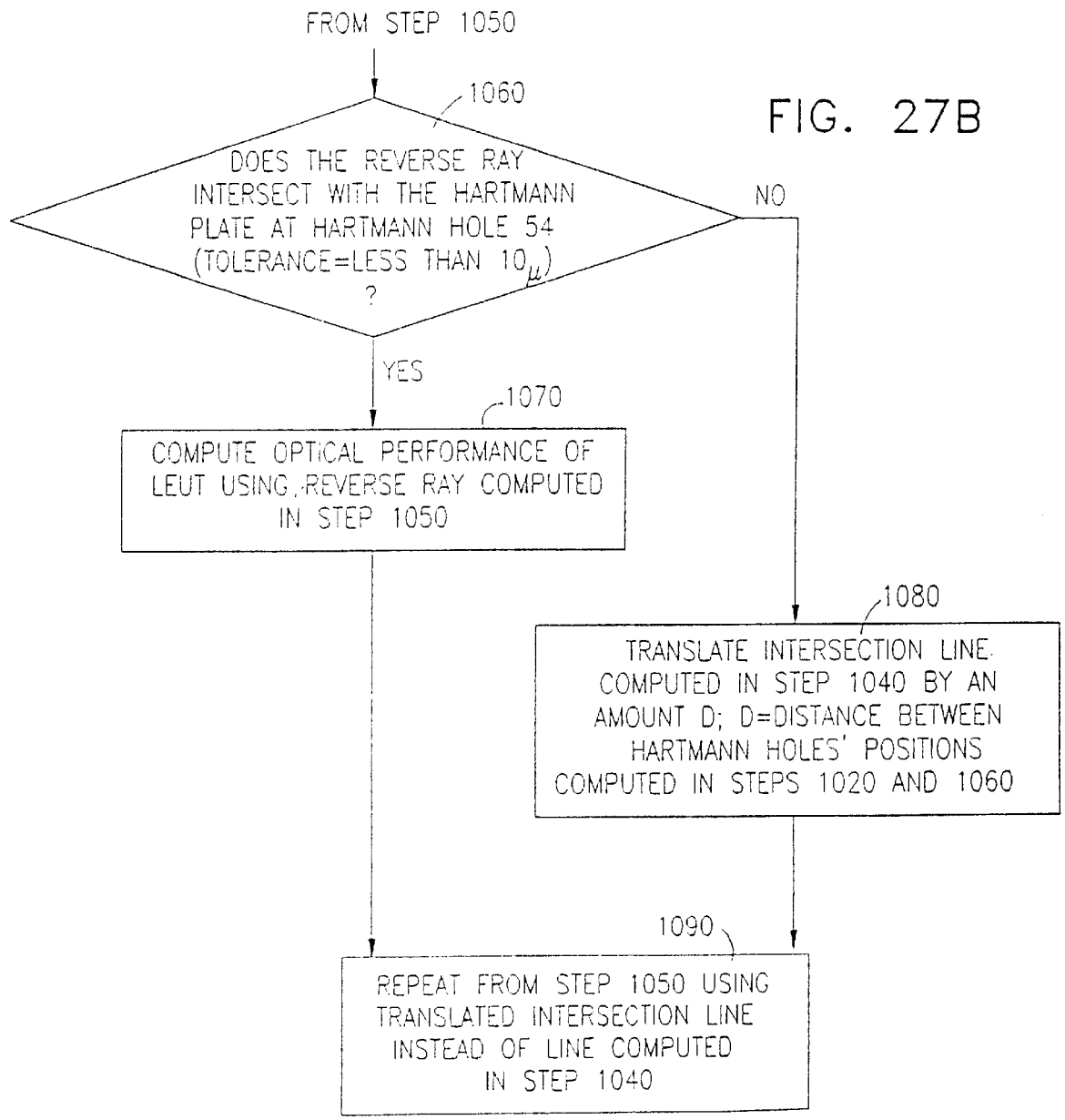

FIGS. 27A to 27C illustrate a preferred reverse ray tracing method suitable for performing step 320 of FIG. 20. The procedure can be found on pages 23–24 of Applicant's above-referenced copending Published PCT Application.

Figure 28:
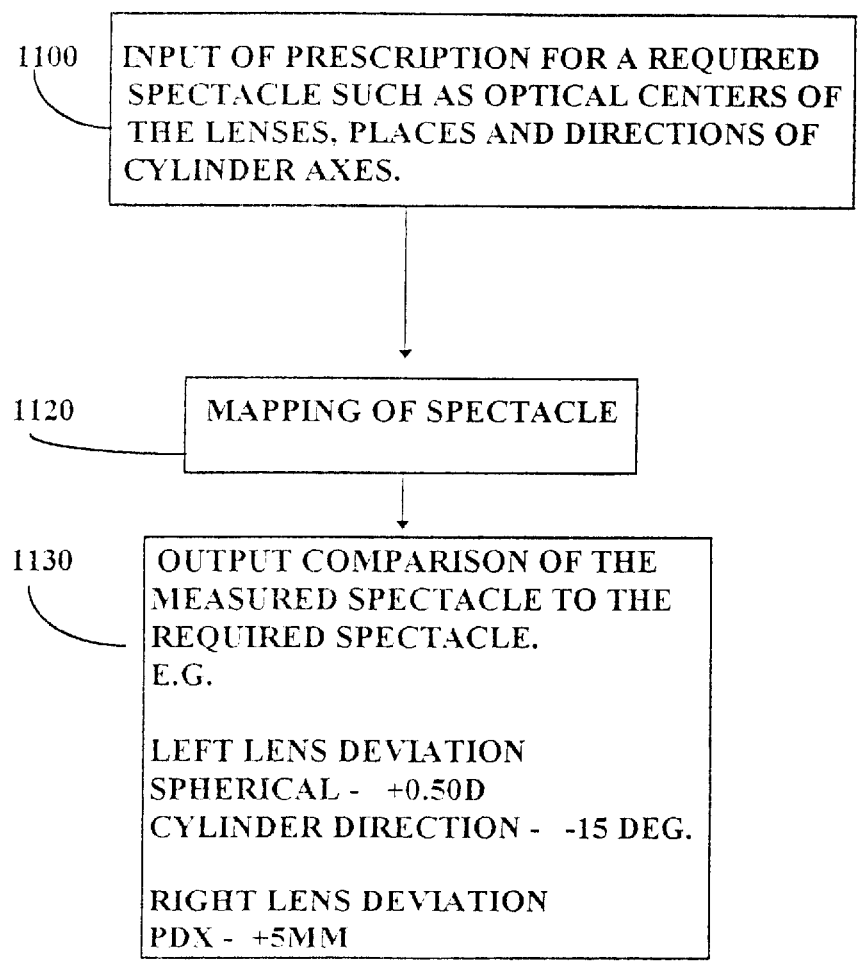
FIG. 28 is a simplified flowchart illustration of a preferred method for automatically determining whether a pair of spectacles conforms or does not conform to a prescription.

According to an alternative embodiment of the present invention, as shown in FIG. 28, the system receives spectacle prescription information which may, for example, be keyed in by a user from a paper prescription. The system generates output indicating whether or not the spectacles under test conform to the prescription.

In the present specification and claims, the term "fixed distance" refers to a distance which is used commonly for a large population of spectacles although it is possible that a different fixed distance would be employed for each of a small number of populations. For example, the fixed distance used for children's spectacles might be different from the fixed distance used for adults' spectacles.

The term "map" refers to a plurality of measurements of an optical characteristic at a corresponding plurality of locations within one or more optical elements.

A map within a single coordinate system of a plurality of fixedly spaced optical elements, such as a pair of lenses mounted in spectacles, refers to a map in which the distances between at least one location in the first optical element and at least one location in the second optical element are known. It is appreciated that once a single location within the first optical element has been localized relative to a single location within the second optical element, all locations within the first optical element are in fact localized with respect to all locations within the second optical element. Localization of optical elements may either comprise relating their respective locations directly or may comprise relating each of their locations to a fixed frame of reference.

For example, the following combination comprises a "map within a single coordinate system":

a. a first map of a first lens mounted in spectacles;

b. a second map of a second lens mounted in the spectacles; and c. an indication of the location of the first map or any location therewith relative to the second map or any location therewithin. The indication may either directly relate the maps to one another or alternatively may relate each of the maps to a single frame of reference such as the frame of the spectacles.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. A method for providing optical information regarding spectacles in which are mounted first and second lenses, the method comprising:

computing a map, within a single coordinate system, of at least one optical characteristic over both of said two lenses; and providing an output indication of optical information related to said map.

2. A method according to claim 1 wherein said step of computing a map comprises:

generating an image of said first lens using an imaging device;

changing the position of the second lens relative to said imaging device by a predetermined distance such that at least a portion of the second lens enters the entrance aperture of the imaging device and generating an image of at least said portion of said second lens; and combining said images into said map, using said predetermined distance.

3. A method according to claim 2 wherein said step of changing position comprises:

moving the second lens relative to the imaging device by a fixed distance; and wherein said predetermined distance comprises a fixed distance.

4. A method according to claim 1 wherein said step of computing a map comprises:

providing an imaging device whose entrance aperture is large enough to image at least portions of said first and second lenses, without moving the spectacles relative to said imaging device; and imaging said at least portions of said first and second lenses, without moving the spectacles relative to said imaging device, using said imaging device.

5. A method according to claim 1 wherein said optical information related to said map comprises the map itself.

6. A method according to claim 1 wherein said optical information related to said map comprises optical information derived from said map.

7. A map according to claim 1 wherein said at least one optical characteristic comprises characteristics pertaining to at least one of the following: spherical power, cylindrical power, cylinder axis, prism, coma, far vision, near vision, and any local lens characteristic.

8. A method according to claim 1 wherein said step of computing a map comprises:

aligning said first lens with respect to the entrance aperture of an imaging device and generating an image of said first lens;

changing the relative positions of the spectacles and the imaging device by a variable known distance so as to align said second lens with respect to the entrance aperture of an imaging device and generating an image of said second lens; and combining said images into said map, using said variable known distance.

9. Apparatus for providing optical information regarding spectacles in which are mounted first and second lenses, the apparatus comprising:

a spectacles mapper operative to compute a map, within a single coordinate system, of at least one optical characteristic over both of said two lenses; and a spectacles analyzer operative to provide an output indication of optical information related to said map.

10. A lens marking device comprising:

a lens marker operative to mark at least one location on a lens and initially occupying a particular position relative to a lens to be marked; and a lens orientation device operative, at least once, to automatically change the position of the lens marker relative to the lens, thereby to allow the lens marker to mark at least one specific location from among said at least one location.

11. A lens marking device according to claim 8 and also comprising a lens analyzer operative to generate control information defining at least one of said at least one location to be marked and to provide said control information to said lens orientation device, and wherein said lens orientation device automatically changes the position of the lens marker in accordance with said control information.

12. A lens marking device according to claim 11 wherein said lens analyzer comprises an optical lens analyzer operative to determine at least one optical characteristic of the lens and to determine at least one of said at least one locations to be marked, based at least partly on said at least one optical characteristic.

13. A device according to claim 12 wherein said lens comprises a toric lens and wherein said at least one optical characteristic includes at least one of the following: a zero prism location and a cylinder axis.

14. A device according to claim 13 wherein said lens comprises a progressive lens and said at least one optical characteristic includes characteristics pertaining to at least one of the following: corridor, far vision and near vision points, sphere, cylinder power, cylinder axis, prism and coma.

15. A device according to claim 12 wherein said lens comprises a spheric lens and said at least one optical characteristic includes characteristics pertaining to at least one of the following: sphere and prism.

16. A device according to claim 12 wherein said lens comprises a bifocal lens and said at least one optical characteristic includes characteristics pertaining to at least one of the following: far vision and near vision points, sphere, cylinder, axis, prism and coma.

17. A device according to claim 10 wherein said lens orientation device is operative to automatically change the position of the lens marker based at least partly on at least one optical characteristic of the lens.

18. Apparatus for measuring an optical characteristic of a location within a lens, the optical characteristic being a multiparametric function of at least a portion of a vicinity of the location, the apparatus comprising:

a vicinity analyzer operative to generate lens location vicinity characterizing information by simultaneously analyzing more than four light rays impinging upon more than four corresponding locations within said vicinity, said vicinity analyzer comprising:

a negative lens operative to diverge said light rays impinging upon said more than four locations, said negative lens introducing aberrations;

an imager operative to generate an image of said diverged light rays impinging upon said lens;

an image analyzer operative to generate said vicinity characterizing information while compensating for the aberrations by performing negative ray tracing; and an optical characteristic computation unit operative to compute said optical characteristic of said location within the progressive lens based on said lens location vicinity characterizing information.

19. Apparatus according to claim 18 wherein said more than four locations comprises at least 9 locations.

20. Apparatus according to claim 18 wherein said lens comprises a progressive lens.

21. Apparatus for inspecting ophthalmic lenses comprising:

a first removable LEUT holder including a first Hartmann plate having a smaller number of holes and a negative lens;

a second removable LEUT holder including a second Hartmann plate having a larger number of holes; and a single optical inspection system for inspecting a LEUT mounted on either one of said removable LEUT holders, having two inspection modes including a mapping mode in which at least one optical parameter of the LEUT is mapped and a lensmeter mode, wherein said negative lens is positioned to diverge rays defined by the Hartmann plate and passing through the LEUT, thereby to facilitate operation of said optical inspection system when operating in said lensmeter mode.

22. Apparatus according to claim 21 wherein said second removable LEUT holder does not include a negative lens.

23. Apparatus for providing optical information regarding spectacles in which are mounted first and second lenses, the apparatus comprising:
   a spectacles analyzer operative to compute optical information characterizing both lenses of said spectacles; and
   a prescription analyzer operative to receive a spectacles prescription, compare the spectacles prescription with said optical information, and generate an output indicating whether or not said spectacles comply with said spectacles prescription.

24. Apparatus for providing optical information regarding an ophthalmic lens, comprising:
   a light source generating an incident measuring beam;
   a Hartmann plate comprising a plurality of holes, and a lens support operative to support the lens such that the lenses' back surface is substantially perpendicular to the incident measuring beam, and is disposed at a predetermined distance in front of said Hartmann plate;
   a lens analyzer operative to generate optical information regarding said lens by analyzing light rays transmitted through said lens and through said plurality of holes in said Hartmann plate; and
   an optical information display unit operative to provide an output indication of said optical information.

25. Apparatus according to claim 24, and wherein said lens analyzer simultaneously generates optical information from a first portion of said ophthalmic lens to provide lensmeter measurement functionality, and optical information from a second portion of said ophthalmic lens to provide mapping functionality.

26. Apparatus according to claim 24, and wherein said lens support comprises three rods of substantially equal length projecting perpendicularly from said Hartmann plate.

27. Apparatus according to claim 24, and wherein said lens support comprises at least part of a cylinder projecting from said Hartmann plate such that its axis is perpendicular to the plate.

28. A method for providing optical information regarding an ophthalmic lens, the method comprising:
   illuminating said lens with an incident measuring beam;
   supporting said lens on a Hartmann plate comprising a plurality of holes, and including a lens support operative to support the lens such that the lenses' back surface is substantially perpendicular to the incident measuring beam, and is disposed at a predetermined distance in front of said Hartmann plate;
   analyzing light rays transmitted through said lens and through at least three of said plurality of holes in said Hartmann plate, to provide a lensmeter measurement functionality;
   analyzing light rays from a portion of said ophthalmic lens to provide mapping measurement functionality; and
   providing output indication of said lensmeter measurement and said mapping measurement simultaneously on one display unit.

* * * * *

UNITED STATES PATENT AND TRADEMARK OFFICE
CERTIFICATE OF CORRECTION

PATENT NO.   : 5,855,074
DATED        : January 5, 1999
INVENTOR(S)  : Mordechai ABITBOL et al.

It is certified that error appears in the above-identified patent and that said Letters Patent is hereby corrected as shown below:

On the title page, item:

--[30]    Foreign Application Priority Data

December 7, 1997    Israel         ..... 122497 --.

Signed and Sealed this

Eighth Day of June, 1999

Attest:

Q. TODD DICKINSON

*Attesting Officer*          Acting Commissioner of Patents and Trademarks

UNITED STATES PATENT AND TRADEMARK OFFICE
CERTIFICATE OF CORRECTION

PATENT NO. : 5,855,074
DATED : January 5, 1999
INVENTOR(S) : Mordechai ABITBOL et al.

It is certified that error appears in the above-identified patent and that said Letters Patent is hereby corrected as shown below:

Col. 21, line 59, change "claim 8" to -- claim 10 --.

Signed and Sealed this

Twenty-first Day of November, 2000

Attest:

Q. TODD DICKINSON

Attesting Officer

Director of Patents and Trademarks